United States Patent
Barve et al.

(10) Patent No.: US 12,505,116 B1
(45) Date of Patent: Dec. 23, 2025

(54) APPARATUS AND METHOD FOR TIME SERIES DATA FORMAT CONVERSION AND ANALYSIS

(71) Applicant: anumana, Inc., Cambridge, MA (US)

(72) Inventors: Rakesh Barve, Bengaluru (IN); Sairam Bade, Thelangana Suryapet (IN); Shashi Kant, Bengaluru (IN); Yash Gupta, Bengaluru (IN)

(73) Assignee: Anumana, Inc., Cambridge, MA (US)

( * ) Notice: Subject to any disclaimer, the term of this patent is extended or adjusted under 35 U.S.C. 154(b) by 0 days.

(21) Appl. No.: 18/591,499

(22) Filed: Feb. 29, 2024

(51) Int. Cl.
G06F 16/24 (2019.01)
G06F 16/2458 (2019.01)
G06F 16/25 (2019.01)

(52) U.S. Cl.
CPC ........ G06F 16/2477 (2019.01); G06F 16/258 (2019.01)

(58) Field of Classification Search
CPC . G06F 16/2477; G06F 16/258; G06F 16/1794
See application file for complete search history.

(56) References Cited

U.S. PATENT DOCUMENTS

| | | | |
|---|---|---|---|
| 11,605,042 B1* | 3/2023 | Perez | G06Q 30/0603 |
| 2002/0001029 A1 | 1/2002 | Abe | |
| 2013/0182930 A1* | 7/2013 | Trzasko | G06T 11/006 382/131 |
| 2017/0011210 A1 | 1/2017 | Cheong et al. | |
| 2018/0075581 A1* | 3/2018 | Shi | G06N 3/045 |
| 2018/0211182 A1* | 7/2018 | Lei | G06V 10/7715 |
| 2019/0286938 A1* | 9/2019 | Backhus | G06F 18/214 |
| 2019/0294953 A1* | 9/2019 | Bordaweker | G06N 3/08 |
| 2019/0325624 A1* | 10/2019 | McRaven | G06F 11/32 |
| 2020/0387492 A1* | 12/2020 | Duffield | G06F 16/283 |
| 2020/0397313 A1 | 12/2020 | Attia | |
| 2021/0150684 A1* | 5/2021 | Elmoznino | G06V 10/764 |
| 2021/0312232 A1* | 10/2021 | Tensmeyer | G06N 3/084 |
| 2022/0129747 A1* | 4/2022 | Cetintas | G06N 3/08 |
| 2022/0180190 A1* | 6/2022 | Verma | G06N 3/047 |
| 2022/0304613 A1 | 9/2022 | Albert | |
| 2023/0196123 A1* | 6/2023 | Kubota | G06N 3/09 706/15 |
| 2023/0368438 A1* | 11/2023 | Shen | G06T 11/006 |
| 2024/0005651 A1* | 1/2024 | Manevitz | G06N 3/08 |
| 2024/0028831 A1 | 1/2024 | Jain et al. | |
| 2024/0029460 A1 | 1/2024 | Brown et al. | |
| 2024/0061436 A1 | 2/2024 | Tsuzaki et al. | |
| 2024/0078644 A1* | 3/2024 | Veloso | G06T 5/77 |

FOREIGN PATENT DOCUMENTS

EP    4272645 A1    11/2023

OTHER PUBLICATIONS

PCT/US2025/017397; International Search Report; Date: Jul. 1, 2025; By: Authorized Officer: Harry Kim.

* cited by examiner

Primary Examiner — Kavita Stanley
Assistant Examiner — Cecile H Vo
(74) Attorney, Agent, or Firm — Caldwell Intellectual Property Law

(57) ABSTRACT

An apparatus and method for static image of time series measured data to time series translation is disclosed. The apparatus comprises at least a processor configured to receive a static image of time series measured data, convert that static image from its initial domain to a usable time series within another user-selected domain, then to validate the conversion against a confidence threshold.

22 Claims, 10 Drawing Sheets

APPARATUS AND METHOD FOR TIME SERIES DATA FORMAT CONVERSION AND ANALYSIS

FIELD OF THE INVENTION

The present invention generally relates to the field of machine-learning. In particular, the present invention is directed to an apparatus and method for translating unpaired time series data between applications where protocols and formatting differences have previously made conversion and comprehension cumbersome.

BACKGROUND

Conversion and analysis of time series measurements, such as measurements from environmental sensors or medical devices, is an increasingly ubiquitous and vital component of the analytical data path originating from such measurements. However, the multiplicity of different encoding and recording protocols from the various forms of devices capturing those time series measurements makes training and use of such analysis inapplicable for most data sets that could otherwise be used, undermining the principal advantages that machine-learning could furnish.

SUMMARY OF THE DISCLOSURE

In an aspect, an apparatus for time series data format conversion and analysis is disclosed. The apparatus comprises at least a computing device configured to receive a static image of time series measured values, convert that static image from its initial domain to a usable time series within another user-selected domain using machine-learning processes, then to analyze the data for issues or significant features.

In an aspect, a method for static image time series data to dynamic time series data translation is disclosed. The method comprises receiving, by a computing device, a static image of time series measured values, converting, by the computing device, that static image from its initial domain to a usable time series within another user-selected domain, then validating, by the computing device, the conversion against a confidence threshold.

Some embodiments relate to an apparatus for time series data format conversion and analysis using machine learning. The apparatus may include at least a processor, and a memory communicatively connected to the at least a processor, the memory containing instructions configuring the at least a processor to: receive a time series of measured values wherein the time series of measured values includes a static image, convert the at least a time series from the static image to a target domain protocol, wherein the conversion includes: parsing the received time series of measured values into vector data representing the source data, converting the vector data to data points, scaling the converted data points on a horizontal time axis, and aligning the converted data points on a vertical signal axis.

In some embodiments of the apparatus, the at least a time series may additionally include a first time series including a first static image in a first static image format and a second time series in a second static image in a second static image format and the second static image format may be distinct from the first static image format. In some cases, converting the at least a time series may additionally include converting the first static image to a common domain protocol and converting the second static image to the common domain protocol.

In some embodiments of the apparatus, the memory may contain further instructions configuring the at least a processor to instantiate a machine-learning model on an analytical circuit device, wherein the machine-learning model configures the analytical circuit device to perform the analytical process and input the converted at least a time series to the instantiated machine-learning model. In some cases, the machine-learning model may include a generative adversarial network machine-learning process. In some cases, the machine-learning model may include a diffusion-based machine-learning process. In some cases, the machine-learning model may include a generative machine-learning process using at least a deep neural network. In some versions, the at least a deep neural network includes a plurality of deep neural networks.

In some embodiments of the apparatus, converting additionally includes converting using a plurality of conditional inputs.

In some embodiments of the apparatus, the apparatus is further configured to retranslate the at least a time series from the target domain protocol to the at least an initial static image and validate the converted time series as a function of the retranslation.

Some embodiments relate to a method for time series data format conversion and analysis. The method may include receiving, by a computing device, a time series of measured values, wherein the time series of measured values is a static image, converting, by the computing device, the static image time series of measured values to a target domain protocol, wherein the conversion includes parsing the received time series of measured values into vector data representing the source data, converting the vector data to data points, scaling the converted data points on a horizontal time axis, and aligning the converted data points on a vertical signal axis.

In some embodiments of the method, the at least a time series may additionally include a first time series including a first static image in a first static image format and a second time series in a second static image in a second static image format and the second static image format is distinct from the first static image format. In some cases, converting the at least a time series additionally includes converting the first static image to a common domain protocol and converting the second static image to the common domain protocol.

In some embodiments of the method, the method additionally includes instantiating a machine-learning model on an analytical circuit device, wherein the machine-learning model configures the analytical circuit device to perform the analytical process, and inputting the converted at least a time series to the instantiated machine-learning model. In some cases, the machine-learning model further comprises a generative adversarial network machine-learning process. In some versions, the generative adversarial networks machine-learning process relies on machine-learning processes to iteratively map, by the computing device, an input to an output and comparatively eliminate cycle consistency losses as referenced against a concurrent mapping sequence. In some cases, the machine-learning model further comprises a diffusion-based machine-learning process. In some cases, the machine-learning model further comprises a generative machine-learning process using at least a deep neural network. In some versions, the at least a deep neural network includes a plurality of deep neural networks.

In some embodiments of the method, converting additionally includes converting using a plurality of conditional inputs.

In some embodiments of the method, the method additionally includes retranslating the at least a time series from the target domain protocol to the at least an initial static image and validating the converted time series as a function of the retranslation.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for unpaired time series to time series translation. The apparatus comprises at least a computing device configured to receive an automated analysis of a time series, convert that time series from its initial domain to a usable time series within another user-selected domain, then to validate the conversion against a confidence threshold.

Figure 1:
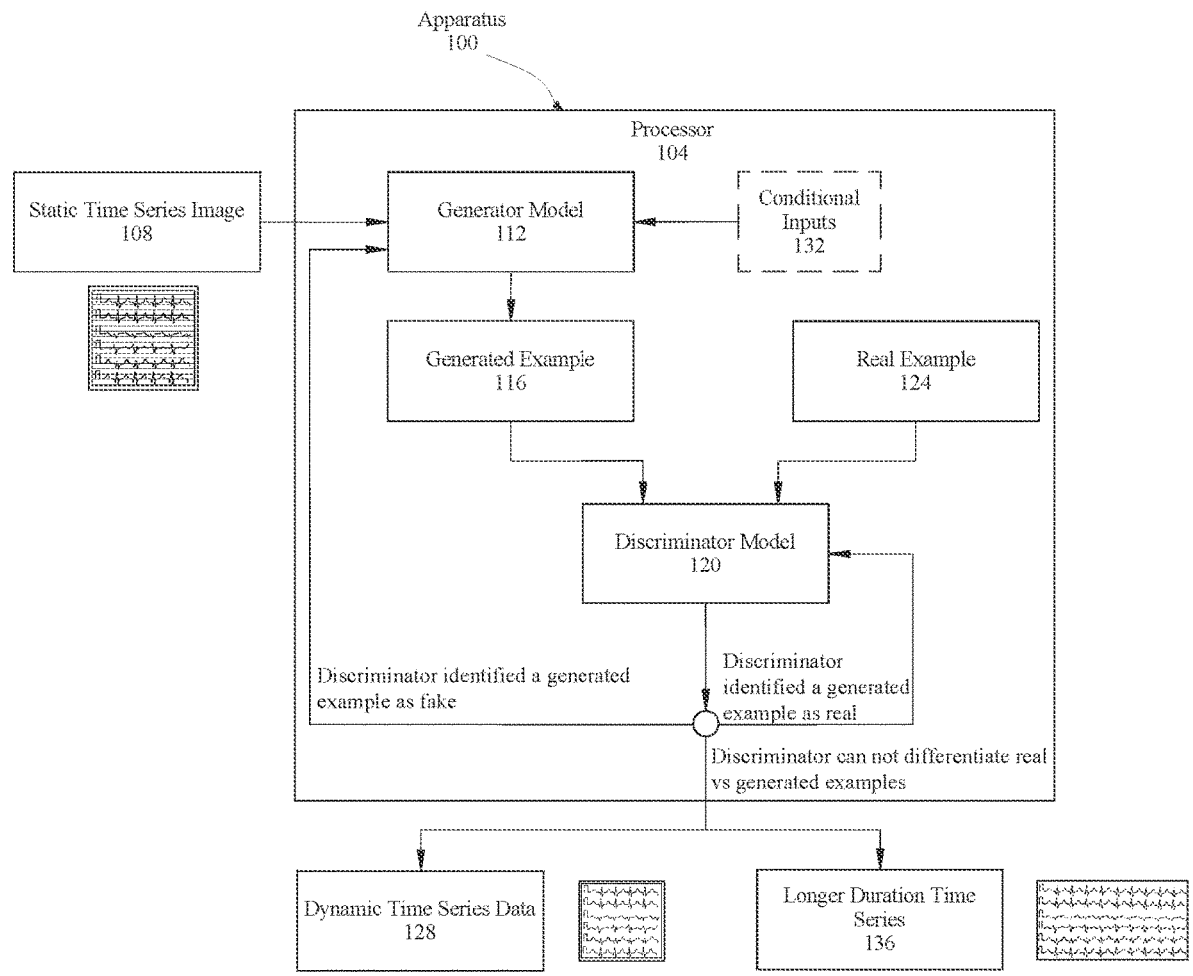
FIG. 1 is a block diagram of an exemplary embodiment of an apparatus for translating static images of time series data into.

Referring now to FIG. 1, an exemplary embodiment of apparatus 100 for unpaired time series data translation is illustrated. The apparatus includes a processor 104. Processor 104 may refer to any computing device as described in this disclosure, including without limitation a microcontroller, microprocessor, digital signal processor (DSP), and/or system on a chip (SoC) as described in this disclosure. Processor 104 may include, be included in, and/or communicate with a mobile device such as a mobile telephone or smartphone. Processor 104 may include a single computing device operating independently, or may include two or more computing devices operating in concert, in parallel, sequentially, or the like; two or more computing devices may be included together in a single computing device or in two or more computing devices. Processor 104 may interface or communicate with one or more additional devices as described below in further detail via a network interface device. Network interface devices are described in detail below. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable the scalability of apparatus 100 and/or processor 104. Detailed description of a computing device embodiment is described below in reference to FIG. 10.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With further reference to FIG. 1, processor 104 is configured to receive at least a time series of measured values. Time series of measured values includes a static image. As used herein, a "time series" refers to at least a sequence of data points collected at a given sample rate in terms of samples per second over an interval of time, and in many cases includes collection of multiple simultaneous parallel data points within the same or similar domain. Sample rate may also be expressed in Hertz, samples per second, samples per minute, samples per hour, or other sample rate formats. Static image may be in any image format including without limitation bitmap, joint photographic experts group (jpeg), graphics interchange format (gif), tag image file format (tiff), portable document format (PDF), or the like. Static image may be sourced from a sensor which may include any sensor capable of collecting time series data including, without limitation, a device for capturing an electrocardiogram (ECG), also known as an ECG-enabled device, including without limitation any ECG device having any number of leads and/or electrodes, including without limitation a 12-lead ECG machine such as a Biocare 12-lead ECG machine, a 6-lead ECG machine, an exercise ECG machine, a Holter monitor, a wearable device such as an exercise ECG tracker, a smart watch having a wrist sensor, or the like, and/or any other device capable of capturing ECG data and/or any component thereof. This sensor may alternatively or additionally include any type of device capable of capturing electroencephalograms (EEGs), magnetic resonance imagers, electromyography scans (EMGs), galvanic skin response sensors, fitness trackers, blood pressure monitors, sleep trackers, blood-oxygen level monitors, heart rate trackers, diabetes or herpes trackers, immune disorder logs, or any other medical imaging or time series data capable of being plotted. At least a sensor may refer to standalone devices, such as those used exclusively in established medical facilities, such as magnetic resonance imagers, computerized tomography scans, x-rays, ultrasounds, radiotherapy equipment, intravenous monitors, or any other standalone device. While this disclosure openly discusses medical devices, the disclosure applies to any time series collection devices including non-medical applications wherein the exportable information is limited to static images of the time series data. Additionally, at least a sensor may be a plurality of handheld, or wearable devices such as a Fitbit watch or wristband or other wearable heart rate monitor, a pacemaker or other cardiac rhythm management implant, glucose monitor, smart watch, real-time blood pressure sensors, temperature monitors, respiratory rate monitors or other biosensors, or any other wearable monitor.

Still referring to FIG. 1, for the purposes of this disclosure, "static image time series of measured values" is a digital or printed image compiling information usually derived from a digital device interrogation output, formatted based on the source device protocols and containing time series data capable of being plotted on a two-dimensional axis. As used herein, "static" implies that all image data, metadata, and numerical information contained within the image, even when digitally stored, is inaccessible for processing outside of a human or machine interpreting the image and translating it to a different format that may be interacted with or digitally extracted. In a non-limiting embodiment, a screenshot of a chart is generally considered static data since the data cannot be digitally extracted, but rather only visually observed. Conversely, a dynamic image may include an Excel chart as viewed within Excel, or a time series readout directly within an ECG machine, or any image where the underlying data may be exported to a .csv or similar file format. Static time series image 108 may be in image format, wherein the discrete data points may be identified and interpreted from the image. In other applications of Generative Adversarial Networks, inputs may include a plurality of different types or domains, including without limitation text, code, images, molecules, audio (e.g., music), video, and robot actions (e.g., electromechanical system actions). As a non-limiting example, an ECG recording's data set of voltage measured over a 30-second period at a frequency ranging from 50 Hz-500 Hz may be plotted, recorded, and saved or printed for use by processor 104 as static time series image 108. Time-plotted voltages, especially within the range of voltages expected to be detected from a human heart through skin contact, exported from any capable device, may be used for static time series image 108. In a non-limiting embodiment, static time series image 108 may further include any set of plotted time series data which may be valuable within a separate set of domain protocols other than its original static image source.

Still referring to FIG. 1, static time series image 108, in a non-limiting embodiment may be input in a multitude of source formats including Portable document format (PDF), Portable Network Graphics (PNG), Joint Photographic Experts Group (JPEG), Tagged Image File (TIFF), Bitmap Image File (BMP), Photoshop Document (PSD), Encapsulated Postscript (EPS), Adobe Illustrator Document (AI), Adobe Indesign Document (INDD), Raw Image Format (RAW) or other static image formats. Processor 104 may then convert all static time series images 108 into a single format while converting the data internally, or processor 104 may support direct conversion from each distinct input format option to any designated target domain protocol format.

Still referring to FIG. 1, processor 104 is configured to convert the static time series images 108 into a single format by parsing the received time series of measured values into vector data representing the source data, identifying the specific sensor associated with each vector data when multiple sensors are combined into a single time series, converting the vector data to data points, and scaling and aligning the converted data points. For instance, converted data points may be scaled along a time axis (e.g., horizontal axis) and aligned on a signal axis (e.g., vertical axis). Time axis and signal axis may span two-dimensions; in some cases, time axis may be orthogonal to signal axis. Signal axis may represent signal values, e.g., lead voltage from ECG. As used herein, "parsing" refers to the process of separating and analyzing the individual time series sensor inputs while retaining the relationships between the parsed data and all affiliated data. In a non-limiting embodiment, an ECG may contain twelve or more individual leads, each transmitting a separate time series of voltages plotted over time. Each individual ECG lead time series may be separated into individual vector data sets containing the voltage values and their affiliated times as individual data points, and independently analyzed by processor 104. Processor 104 may additionally enable converting the time series data points to various time-segmented time series data sets. In a non-limiting embodiment, a 10 second ECG time series may be clipped down to a 2.5 second or 5 second ECG, or segmented into these or other smaller time increments as directed by the user.

Further referring to FIG. 1, as a non-limiting example, static time series image 108 may include a patient's blood pressure plotted over a specified time, heart rate, blood-sugar, stress test data, or any relevant time series data associated with a specified initial domain protocol. Static time series image 108 may additionally contain identifying or descriptive data meant primarily to support the targeted time series data. For example, static time series image 108 may include timing information for when the time series was initially recorded, appended notes from medical professionals, location data, or any other appropriate information. These additional data tags embedded within the static time series image 108 may be used as training data to support pairing input data to output data. Specifically, in a non-limiting embodiment, in the example of an ECG time series, various inputs and grouping mechanisms may aid diagnosis of a cardiac irregularity, which may be an indicator of an atrial or ventricular fibrillation. Once confirmed by a medical professional, especially if in multiple instances of repeating similar circumstances, the machine learning model may identify patterns across these instances such that it could grow to act as an early warning system for more severe conditions. Continuing in this non-limiting embodiment, various types of input data included in static time series image 108 may be grouped together in a logical manner to support these types of early warning diagnosis support. In an additional non-limiting embodiment, heart rate training data may support detecting and diagnosing a tachycardia or bradycardia condition, each of which may be indicative of severe or complex issues needing immediate response care. Additionally, blood pressure, electromyography data, computerized tomography (CT) scans, magnetic resonance imaging (MRI), or any other device where data is collected over time and is operative only within an initial domain protocol may be included in static time series image 108.

Still referring to FIG. 1, static time series image 108 may consist of various ECG formats. In a non-limiting embodiment, a 12-lead ECG may use various recording formats including 3×4, 3×4+R, 3×4+3R, 6×2, 6×2+R, 6×2+3R, 12, 12+R, 12+3R, and/or rhythm mode, then may store the data so recorded within its proprietary system; such a device may enable exporting the collected data to a JPEG, PNG, TIFF, Bitmap, GIF, EPS, RAW image file, or other form of digital image. Additionally, any type of image of time series data may be screenshot and/or printed and subsequently used as input for static time series image 108. As a further non-limiting example, an ECG machine may use application of Minnesota Code, CSE and/or AHA database formatting guidelines, as well as support for an ECG management system or HL7 protocol. Each of these specified formats and data exchange protocols may be interoperable with other ECG devices, but they may be exclusive to a hardware sensor and/or sensor component relied upon to generate the data.

Still referring to FIG. 1, static time series image 108 may include multiple time series each with separate domain protocol formats. Specifically, processor 104 may receive static time series image 108 that may include a first time series and a second time series; each of first time series and second time series may include time-series data pertaining to the same category of process being measured, such as time-series data from the same type of diagnostic process or the like. In an embodiment, first time series may be recorded by and/or received from a first device while second time series may be recorded by and/or received from a second device; first device and second device may be different devices and/or different types of devices and may record using the same initial domain protocol as each other or may record in two distinct initial domain protocols. Initial time series data may include a plurality of sets of time series data from a plurality of devices, of which any two devices may include a first device and second device as described above; such initial time series data may include datasets in a plurality of distinct initial domain protocols. As a non-limiting example, multiple ECG data sets, which may be recorded with multiple initial domain protocols, may be used as static time series image 108 to develop a single common protocol for the data sets from each ECG as described in further detail below. Conversion of initial domain protocols to a common protocol may enable a medical professional to use any or all such datasets within either or both hardware configurations to analyze the ECG data. Development of a common domain protocol may be used to support future conversions.

With continued reference to FIG. 1, static time series image 108 may be received through a network of connected devices. In a non-limiting embodiment, a device that captures one or more elements of time series data and/or performs one or more steps described in this disclosure may be communicatively connected to one or more other devices, including without limitation any devices described in this disclosure, a local area network (LAN), a wide area network (WAN) such as the Internet or a subset thereof, such that all recorded data may be accessible via any other web enabled device. In this way, static time series image 108 may be requested and imported into processor 104 via web or local network interface. Processor and/or another device may divide processing tasks between multiple processors to accelerate delivery of completed dynamic time series data 128.

With continued reference to FIG. 1, static time series image 108 may be received through a direct file importing process, wherein static time series image 108 may be saved and downloaded to processor 104. This may include file transfers from any type of hard drive or other memory type exchange or replication. Static time series image 108 may be locally generated in cases where processor 104 is built in conjunction with or contained within an ECG-capable device. Static time series image 108 may also be imported into processor 104 through manual generation, wherein a user populates all necessary data by any mechanism wherein the minimum required set of time series data is made available to apparatus 100.

With continued reference to FIG. 1, static time series image 108 may be received from a scanning device. In cases where the time series data is only available in a tangible, paper format, the image may be scanned in using any scanner with sufficient clarity in its scanning process. Processor 104 may allow for direct ingestion of the scanned time series image or may support a conversion to a preferred image format. Scanning of the time series image may be accomplished in any manner capable of generating a digital representation of the time series image to include mobile phone image scans, drum scanner scans, flatbed scans, or others.

Still referring to FIG. 1, processor 104 may rely on optical character recognition or optical character reader (OCR), executed by processor 104 to automatically convert images of written (e.g., typed, handwritten or printed) text into machine-encoded text. In some cases, recognition of at least a keyword from an image component may include one or more processes, including without limitation optical character recognition, optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyzes a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIG. 5 below. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool includes OCRopus. OCRopus development is led by German Research Centre for Artificial Intelligence in Kaiserslautern, Germany. In some cases, OCR software may employ neural networks, for example neural networks as taught in reference to FIGS. 6-7 below.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, image recognition and processing may build upon the character recognition methods discussed above. Time series data is generally less complex to interpret than the infinite possible image types, so a predefined analysis which targets time series types of data may be efficiently translated to an interrogable format, such that the image data may have numerical statistics applied and an underlying algorithm to define the time series graph. As used herein, an "interrogable" format is a format in which the individual data points that make up the time series are both quantified and accessible by processor 104 and the user for processing and analysis. For instance, and without limitation, an interrogable format may permit processor 104 and/or a user to isolate a specific data point such as a value at a set time, a sample number, the sample rate used, or any numeric value associated with any part of the time series. As a further example, in an interrogable format, time series data be possible to be retrieved and/or analyzed using indices, similarly to a vector or array data structure. Interrogable format may alternatively or additionally permit retrieval of entries according to times, which may map to indices and/or act as a substitute therefor. Alternatively or additionally, interrogable format may be configured to permit retrieval of time and/or indices of entries having specified values and/or falling into a range of specified values. As a further alterative or additional example, interrogable format may be configured to retrieve indices, times, values, and/or ranges of values corresponding to peaks, troughs, system and/or user-entered threshold values, first, second, or higher-order derivatives of curves and/or linearized and/or localized approximations thereof, or any other mathematical or other characteristic of a curve or other graphical object represented in interrogable format. Alternatively or additionally, an interrogable format may be a format that can return a set of values belonging to a range, such as a range of values over a period of a periodic signal, a range of values over a fraction of a period such as a half-period, quarter-period, or the like, a range of values found between two consecutive specified points as described above, including between two peaks, troughs, zeros, zeros of first, second, or higher-order derivatives, or the like. As an additional example, interrogable format may permit and/or be configured to perform retrieval of samples from a portion of a graph and/or signal that matches a particular pattern, such as a pattern representing a specific cardiac event such as a "heart murmur," Q-waves, delta waves, Brugada syndrome signal elements, QRS-end slurring and/or notching, Digoxin effects, arrythmias, and/or other elements of interest in analysis of a signal. Pattern matching may be performed, without limitation, using a classifier, which may include any classifier as described in this disclosure. Classifier may be trained using training data correlating sequences of samples with matching sequences of samples and/or labels as entered, for instance, by an expert user such as a medical provisional; in some embodiments, a query may include a sequence to be matched with sequences within a signal in interrogable format, while in other embodiments query may include a label, for instance by way of classifying different sequences within interrogable signal to labels that can then be matched to queries containing similar labels. Any or all of the data structures and/or elements used for retrieval may be a part of a data structure instantiating interrogable format and/or may be maintained and/or utilized separately on apparatus or other devices. Interrogation of time series data may further support additional analysis including medical diagnoses, outlier erred data, or other identifiable information from the quantified dataset. Translation of the raw image into a numerically defined time series format may rely and/or include optical character recognition described above to interpret axes and/or labels of data. With the axes and/or labels defined, time series numerical characteristics may be applied based on the timing and relative locations of peaks and troughs, consistency of the waveform, amplitudes, and any other identifiable features.

Still referring to FIG. 1, processor 104 is configured to convert at least a static time series image 108 to a dynamic time series dataset within a target domain protocol. Conversion of the static time series image 108 to a dynamic time series data 128 may use an unsupervised generative machine-learning process. As used in this disclosure, a "target domain protocol" is a domain protocol to which data received in one or more initial domain protocols is converted; target domain protocol may be a distinct domain protocol from each initial domain protocol or may be one of a plurality of initial domain protocols. Where two or more domain protocols exist for a given category of time-series data, target domain protocol may serve as a common domain protocol into which all other domain protocols may be converted, for instance and without limitation permitting use of all such converted datasets as training data and/or inputs for a machine-learning model, display of all such converted datasets at or by a given device that can accept and/or display data using target domain protocol, or the like. As used herein, a "common domain protocol" is a selected protocol to which all the different domains are translated so they can be used together in a process such as a machine-learning process. While a common domain protocol may not be a required transition for all time series conversions, in many cases it may allow for a standardized conversion process and gain efficiency within processor 104 operations. In some embodiments, processor 104 may be used to generate a universal common domain such that the common domain may act as the target domain and/or be used as real example 124. Use of a common domain may allow for an immediate conversion of all time series data sets immediately after generation such that all data of a specific type may be collocated and compatible within the common domain. A common domain time series data may then either be converted to a separate, user-specified target domain by repetition of processes for conversion as described in this disclosure, or it may be used as it exists in the common domain format. In this way, a common domain implementation may be used as an intermediary interpretation, to enable the comparing and contrasting of multiple sources of time series data, while also simplifying the conversion from the common domain to the various target domains. Use of a common domain protocol may simplify various conversions by converting from thousands of device domains to a single, unitary domain format.

With continued reference to FIG. 1, in one or more embodiments, processor 104 may implement one or more aspects of "generative artificial intelligence (AI)," a type of AI that uses machine learning algorithms to create, establish, or otherwise generate data such as, without limitation, dynamic ECG datasets and/or the like in any data structure as described herein (e.g., text, image, video, audio, among others) that is similar to one or more provided training examples. In an embodiment, machine learning module described herein may generate one or more generative machine learning models that are trained on one or more sets of dynamic time series datasets generated from static images of time series information. One or more generative machine learning models may be configured to generate new examples that are similar to the training data of the one or more generative machine learning models but are not exact replicas; for instance, and without limitation, data quality or attributes of the generated examples may bear a resemblance to the training data provided to one or more generative machine learning models, wherein the resemblance may pertain to underlying patterns, features, or structures found within the provided training data.

Still referring to FIG. 1, in some cases, generative machine learning models may include one or more generative models. As described herein, "generative models" refers to statistical models of the joint probability distribution P (X, Y) on a given observable variable x, representing features or data that can be directly measured or observed (e.g., timing, amplitude, frequency, peaks, troughs, etc.) and target variable y, representing the outcomes or labels that one or more generative models aims to predict or generate (e.g., fully defined ECG time series data). In some cases, generative models may rely on Bayes theorem to find joint probability; for instance, and without limitation, Naïve Bayes classifiers may be employed by processor 104 to categorize input data such as, without limitation, static time series data into different categories such as, without limitation, single-lead ECG, 12-lead ECG, wearable devices, or other forms of time series data capture.

In a non-limiting example, and still referring to FIG. 1, one or more generative machine learning models may include one or more Naïve Bayes classifiers generated, by processor 104, using a Naïve bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction.

Still referring to FIG. 1, although Naïve Bayes classifier may be primarily known as a probabilistic classification algorithm; however, it may also be considered a generative model described herein, for instance when used for modeling the joint probability distribution P (X, Y) over observable variables X and target variable Y. In an embodiment, Naïve Bayes classifier may be configured to make an assumption that the features X are conditionally independent given class label Y, allowing generative model to estimate the joint distribution as $P(X, Y)=P(Y)\Pi_i P(X_i|Y)$, wherein P(Y) may be the prior probability of the class, and $P(X_i|Y)$ is the conditional probability of each feature given the class. One or more generative machine learning models containing Naïve Bayes classifiers may be trained on labeled training data, estimating conditional probabilities $P(X_i|Y)$ and prior probabilities P(Y) for each class; for instance, and without limitation, using techniques such as Maximum Likelihood Estimation (MLE). One or more generative machine learning models containing Naïve Bayes classifiers may select a class label y according to prior distribution P(Y), and for each feature $X_i$, sample at least a value according to conditional distribution $P(X_i|y)$. Sampled feature values may then be combined to form one or more new data instance with selected class label y. In a non-limiting example, one or more generative machine learning models may include one or more Naïve Bayes classifiers to generate new examples of numerically defined time series data based on a static image of time series data (e.g. printed exports or screenshots of time series data), wherein the models may be trained using training data containing a plurality of features e.g., timing, frequency, amplitude, and other time series features, and/or the like as input correlated to a plurality of labeled classes e.g., single-lead, multi-lead, wearable device, or other time series as output.

Still referring to FIG. 1, in some cases, one or more generative machine learning models may include generative adversarial network (GAN). As used in this disclosure, a "generative adversarial network" is a type of artificial neural network with at least two sub models (e.g., neural networks), a generator, and a discriminator, that compete against each other in a process that ultimately results in the generator learning to generate new data samples, wherein the "generator" is a component of the GAN that learns to create hypothetical data by incorporating feedback from the "discriminator" configured to distinguish real data from the hypothetical data. In some cases, generator may learn to make discriminator classify its output as real.

With continued reference to FIG. 1, in an embodiment, discriminator may include one or more discriminative models, i.e., models of conditional probability P (Y|X=x) of target variable Y, given observed variable X. In an embodiment, discriminative models may learn boundaries between classes or labels in given training data. In a non-limiting example, discriminator may include one or more classifiers as described in further detail below with reference to FIG. 5 to distinguish between different categories e.g., real vs. fake, or correct vs. incorrect, or states e.g., TRUE vs. FALSE within the context of generated data such as, without limitations, dynamic time series data 128, and/or the like. In some cases, processor 104 may implement one or more classification algorithms such as, without limitation, Support Vector Machines (SVM), Logistic Regression, Decision Trees, and/or the like to define decision boundaries.

In a non-limiting example, and still referring to FIG. 1, generator of GAN may be responsible for creating synthetic data that resembles real dynamic time series data outputs. The discriminator model 120 of GAN may evaluate the authenticity of the generated content by comparing it to real dynamic time series data 128 and/or real example 124, for example, discriminator may distinguish between genuine and generated content and providing feedback to generator to improve the model performance.

With continued reference to FIG. 1, in other embodiments, one or more generative models may also include a variational autoencoder (VAE). As used in this disclosure, a "variational autoencoder" is an autoencoder (i.e., an artificial neural network architecture) whose encoding distribution is regularized during the model training process in order to ensure that its latent space includes desired properties allowing new data sample generation. In an embodiment, VAE may include a prior and noise distribution respectively, trained using expectation-maximization meta-algorithms such as, without limitation, probabilistic PCA, sparse coding, among others. In a non-limiting example, VAE may use a neural network as an amortized approach to jointly optimize across input data and output a plurality of parameters for corresponding variational distribution as it maps from a known input space to a low-dimensional latent space. Additionally, or alternatively, VAE may include a second neural network, for example, and without limitation, a decoder, wherein the "decoder" is configured to map from the latent space to the input space.

In a non-limiting example, and still referring to FIG. 1, VAE may be used by processor 104 to model complex relationships between static time series images e.g., ECG readouts, EEGs, magnetic resonance imagers, EMGs, galvanic skin response sensors, fitness trackers, blood pressure monitors, sleep trackers, blood-oxygen level monitors, heart rate trackers, diabetes or herpes trackers, immune disorder logs, or any other medical imaging or time series data capable of being plotted. In some cases, VAE may encode input data into a latent space, capturing each ECG lead's characteristics individually before subsequent compilation and recombination of all leads' inputs. Such encoding process may include learning one or more probabilistic mappings from observed static time series images to a lower-dimensional latent representation. Latent representation may then be decoded back into the original data space, therefore reconstructing the time series image. In some cases, such decoding process may allow VAE to generate new examples or variations that are consistent with the learned distributions.

With continued reference to FIG. 1, in some embodiments, one or more generative machine learning models may be trained on a plurality of visual data as described herein, wherein the plurality of visual data may provide visual information that generative machine learning models analyze to understand the dynamics of the varying categories of time series data types. Additionally, or alternatively, one or more generative machine learning models may utilize one or more predefined templates representing, for example, and without limitation, correct dynamic time series data 128 outputs. In a non-limiting example, one or more quantified ECG time series (i.e., predefined models or representations of correct and ideal single-lead, multi-lead, or wearable device outputs) may serve as benchmarks for comparing and evaluating plurality of dynamic time series data.

Still referring to FIG. 1, processor 104 may employ a process, such as without limitation a generative process as described above, that is different from the conversion from a static image to dynamic time series data as discussed above. Specifically, processor 104 may employ a separate process to generate a longer-duration time series from a short clip of time series data by using generative AI to extrapolate the longer duration time series 136. To accomplish this, processor 104 may be trained with longer sequence time series and shorter sections of those time series which are clipped from them. Processor 104 may then enable generation of longer duration time series 136 with only short clip time series inputs. Additionally, this may enable processor 104 to stitch together multiple short sequence time series data clips to produce a single, longer duration time series 136. In a separate non-limiting embodiment, processor 104 may enable time modulation of the leads in a twelve lead ECG such that leads one through three from time 0 to time A, leads four through six from time A to time B, leads five through nine from time B to time C, and leads ten through twelve from time C to time D are all displayed adjacent to each other. Similarly, processor 104 may enable alternative forms of abbreviation of datasets where deemed appropriate based on user input and training data. Processor 104 may further recognize that the entire time series is mostly inoperative, but that a specific portion is very valuable, wherein processor 104 would then abbreviate the display to only the valuable portion.

Still referring to FIG. 1, processor 104 may support delivering dynamic time series data 128 output in a multitude of formats. Output formats are determined by the user and training data available to processor 104. User may strictly set the output format. In an embodiment, where no strict requirement is directed by the user, processor 104 may estimate the most appropriate format based on historical conversions and user-validated outputs. Additionally, the output format may be set or biased by inputting conditional inputs 132 or real example 124. Both of those biasing options are discussed in detail herein. Output format may be as simple as a vector or array of samples in a comma separated value format. In a non-limiting embodiment, these formats may include Apache Druid, Apache Pinot, Amazon Web Services Timestream, Graphite, OpenTSDB, Influx DB, IBM Informix, MongoDB, TimescaleDB, Prometheus, a processor 104-newly generated format, or any other appropriate output format as determined by the user. In a separate non-limiting embodiment, output format of an ECG time series may include a vectorcardiogram, wherein two-dimensional images of cardiac electrical activity are represented by displaying the spatial locations of ECG waveforms at each sequential time of their duration. User may select the output format based on which format supports the type of analysis to be conducted, aesthetic appearance, maximal data retention, or other criteria. Whichever selection the user deems appropriate may be used as training data for subsequent operations within processor 104.

Still referring to FIG. 1, processor 104, using the training data collected from prior conversions, may identify matched pairs of input static time series image 108 with the affiliated dynamic time series data 128 output. Where a successful conversion is completed, as verified by the user, that conversion may be relied upon in future conversions as training data for processor 104, especially where the same static time series image 108 input format and dynamic time series data 128 output format are involved. Training data from each similar conversion process may be additive such that within the same input and output formats, there may still be applicable training data which applies differently based on the data types and quantities. In a non-limiting embodiment, a successful transition from a PDF static time series image 108 into an InfluxDB dynamic time series data 128 will not preclude the collection of training data from a subsequent conversion again involving PDF to InfluxDB conversion since the underlying data quantity, type and organization may have required modifications in the conversion which may be useful training data.

Still referring to FIG. 1, processor 104 may support error detection and correction in, at, or with converted time series. Error detection may be accomplished by any means accessible for processor 104 including but not limited to contrast or brightness modifications, Fourier Transform analyses, parallel processing and comparison, consistency checks based on assumption of values changing within a certain range over a certain time, missing data points based on adjacent sample rates and timing, or any other error analysis. Additionally, errors may be detected by comparison to past similar engagements where a user either validated a processor 104 identified error, or manually found and corrected an error. Either of these types of error detection may be stored and applied as training data within processor 104. Any and all training data collected from user in regard to error detection and correction may then be used to retrain one or more of the models. In a non-limiting embodiment, the model for conversion can be trained, but so could the model or models for error correction/detection, and so forth. Collection and application of training data may be different for each category of conversion, or even each discrete conversion. Apparatus 100 may be configured to detect error based on user inputs flagging errors; in an embodiment, graphical user interface may provide users with a view of signal in interrogable format that permits users to add annotations, such as without limitation a circle around an erroneous point in a signal, textual explanations thereof, or the like. An interface may enable a user to repair the erroneous point, for instance and without limitation by modification of one or more samples, which modification may include manual entry, in a text field, of a modified value, movement by clicking and dragging or similar graphical interactions of a value up or down relative to a vertical axis of the displayed signal, or the like. Alternatively or additionally, a user may provide a sample portion of a signal that lacks the above-described error and/or that illustrates how the error could be corrected; apparatus 100 may be configured to modify signal in interrogable format as a function of user entries, which process may be repeated until the user is satisfied that the signal is correctly displayed. Alternatively or additionally, such user entries of modifications to signals and/or correct alternatives to incorrect signals may be correlated to defects in signals to form training data; such training data may be used to train a machine-learning model and/or neural network to transform an identified defect or erroneous section of a signal into a corrected defect and/or section of signal. User indication of a defect by above-described entry processes may trigger such a model and/or neural network to perform such a transformation. Alternatively or additionally, user identifications correlated with signal sections may be used to train an error identification model and/or neural network, configured to input signal sections and output identifications of errors; this process may automatically be run to detect errors, which may be flagged for a user and/or corrected automatically as described above. Corrected signal may be displayed to user. Automatic correction may be followed by further detection processes and/or user feedback.

Still referring to FIG. 1, processor 104 may configure generative machine learning models to analyze input data to one or more predefined templates representing correct dynamic time series data as described above, thereby allowing processor 104 to identify discrepancies or deviations from the desired dynamic time series data outputs. In some cases, processor 104 may be configured to pinpoint specific errors in static time series images. In a non-limiting example, processor 104 may be configured to implement generative machine learning models to incorporate additional models to detect and implement externally desirable features. In some cases, errors may be classified into different categories or severity levels. In a non-limiting example, some errors may be considered minor, and generative machine learning model such as, without limitation, GAN may be configured to generate dynamic time series data 128 outputs that contain only slight adjustments while others may be more significant and demand more substantial corrections. In some embodiments, processor 104 may be configured to flag or highlight blurry or otherwise unreadable static time series image 108, altering the static image input to augment the static lead data from adjacent leads, or to flag the flawed input for user action to correct, using one or more generative machine learning models described herein. In some cases, one or more generative machine learning models may be configured to generate and output indicators such as, without limitation, visual indicator and/or any other indicators as described above. Such indicators may be used to signal the detected error described herein.

Still referring to FIG. 1, in some cases, processor 104 may be configured to identify and rank detected common deficiencies (e.g., pixelated or blurry static image data, missing lead data, illogical data input, etc.) across plurality of time series input types; for instance, and without limitation, one or more machine learning models may classify errors in a specific order e.g., missing time series data, pixelated or blurry static image, missing axes labels in a descending order of commonality. Such ranking process may enable a prioritization of most prevalent issues, allowing instructors or processor 104 to address the deficiencies. In a non-limiting example, if two leads of a twelve-lead ECG are not being properly captured due to a failed scanning or import operation, that issue may be detected and targeted with corrective instructions or demonstrations generated by one or more generative machine learning models."

Still referring to FIG. 1, in some cases, one or more generative machine learning models may also be applied by processor 104 to edit, modify, or otherwise manipulate existing data or data structures. In an embodiment, output of training data used to train one or more generative machine learning models such as GAN as described herein may include user-identified successful conversions of time series data from static images to dynamic, numerically defined time series outputs that visually demonstrate modified static time series images e.g., application of consistent axes scaling when the labels were initially clipped from the input static image, and/or the like. In some cases, dynamic time series data 128 outputs may be synchronized with static time series images 108, for example, and without limitation, in a side-by-side or even overlayed arrangement with the input user action data, providing real-time visual guidance. Additionally, or alternatively, a dynamic time series data 128 approximation may be generated using generative machine learning models to express the inability to produce a satisfactory output without modification or correction of the input static time series image 108.

With continued reference to FIG. 1, other exemplary embodiments of generative machine learning models may include, without limitation, long short-term memory networks (LSTMs), (generative pre-trained) transformer (GPT) models, mixture density networks (MDN), and/or the like. As an ordinary person skilled in the art, upon reviewing the entirety of this disclosure, will be aware of various generative machine learning models may be used to convert the static time series image 108 into numerically defined, dynamic time series data 128.

Still referring to FIG. 1, in a further non-limiting embodiment, machine learning module may be further configured to generate a multi-model neural network that combines various neural network architectures described herein. In a non-limiting example, multi-model neural network may combine LSTM for time-series analysis with GPT models for natural language processing. Such fusion may be applied by processor 104 to generate dynamic time series data 128. In some cases, multi-model neural network may also include a hierarchical multi-model neural network, wherein the hierarchical multi-model neural network may involve a plurality of layers of integration; for instance, and without limitation, different models may be combined at various stages of the network. Convolutional neural network (CNN) may be used for image feature extraction, followed by LSTMs for sequential pattern recognition, and a MDN at the end for probabilistic modeling. Other exemplary embodiments of multi-model neural network may include, without limitation, ensemble-based multi-model neural network, cross-modal fusion, adaptive multi-model network, among others. As an ordinary person skilled in the art, upon reviewing the entirety of this disclosure, will be aware of various generative machine learning models that may be used to conduct the static image to dynamic time series data conversion described herein. As an ordinary person skilled in the art, upon reviewing the entirety of this disclosure, will be aware of various multi-model neural network and combination thereof that may be implemented by apparatus 100 consistent with this disclosure.

Continuing to refer to FIG. 1, conversion process may be performed using an unsupervised generative machine-learning process. An unsupervised machine-learning process may include an unsupervised machine-learning process as described in further detail below. A "generative machine-learning process," as used in this disclosure, is a type of unsupervised machine-learning where the algorithm is designed to use existing content such as text, audio, video, images, software code, or other data form to create new artifacts convincingly similar to the input artifacts; a generative machine-learning process may include any process described in this disclosure for training, producing and/or performing functions of a generative model. Generative machine-learning may accept a plurality of inputs or even specific portions or aspects from the plurality of inputs to inform the model to generate the new artifact(s). Generative machine-learning processes may be based on transformer-based models, which rely on internet-based information to interact and create textual content for the user, or generative adversarial networks. For example, ChatGPT and Language Model for Dialogue Applications (LaMDA) interfaces are transformer-based generative machine-learning models designed to interact with humans in an informed, human-like, text-based communication protocol. As a non-limiting example, processor 104 may convert the at least a time series from the initial domain to a target domain protocol using a GAN. A "generative adversarial network" is a data structure that relies on a plurality of machine-learning models such as neural networks, deep learning neural networks, recurrent neural networks, or the like, wherein each internal model is plotted against the others with separate goals and motivators, such that the cumulative evolution of the models eventually generates the programmed output by competing against each other in a digitally hostile development cycle. For instance, and without limitation, processor 104 may use a GAN to execute a conversion from the initial domain protocol to the target domain protocol such that the plurality of models incrementally work against each other to generate domain independent features of static time series image 108 within the target domain protocol. This process may operate based on a net-zero sum operation where one model stochastically generates an attempt at converting data while another model assesses the generated attempt against a set of actual, real-world target domain data. In one embodiment of a GAN, static time series image 108 may operate as an input to a generator model 112. As used herein, a "generator model" is a process to create new artifacts or data based on a plurality of input artifacts or data, or in some cases a random input vector. Generator model 112 may be configured to identify domain boundaries of a source domain and bound output generated example 116 to within those domain boundaries. "Domain boundaries", as used herein are established data standards or protocols, including but not limited to, data organization methods, formats, coding language, numerical maximums and/or minimums, data sizes, encryption type, or other specific limitations necessarily in place to ensure the encompassed data is usable. In a non-limiting embodiment, in reference to an ECG, domain boundaries may include a sample rate, specified collection duration, and an upper and lower voltage threshold. Generator model 112 may rely on stochastic methods, for instance and without limitation as described in further detail below to formulate generated example 116. Generated example 116 may be created by generator model 112 based initially on a random distribution such as without limitation a random Gaussian distribution. Generated example 116 may represent an attempt and/or approximation by generator model 112 at mimicking the real-world static time series image 108. Initially, and prior to conversion, generated example 116 may be erratic and non-representative of static time series image 108. Generator model 112 may use feedback such as error function generated using training data to adjust and improve its operation. In a non-limiting embodiment, machine-learning processes may additionally support evaluation and analysis of the output ECG for identifiable conditions, including without limitation conditions and/or signals associated therewith as described above, or normal sinus heart rhythm. Training data and machine-learning processes are discussed in detail below.

Still referring to FIG. 1, in the non-limiting embodiment of a GAN, generated example 116 from generator model 112 may be provided as one of the two inputs into discriminator model 120. A discriminator model 120 is a model, such as a machine-learning model and/or classifier, used to classify provided examples in a binary format of real or fake. Discriminator model 120 receives generated examples 116 and real examples 124. Real example 124 is a set of data from final target domain, or a set of data that the user wants to train discriminator model 120 to believe is target domain data. Discriminator model 120 may rely on real example 124 and binary classifier 128 feedback for training data. Discriminator model 120, without reference to the example source, assesses both generated example 116 and real example 124 for authenticity of the time series in the target domain. When discriminator model 120 wrongly identifies generated example 116 as real, binary classifier 128 then provides that incorrect assessment as training data to update discriminator model's 120 internal algorithms until discriminator model 120 stabilizes at around a 50% correct assessment rate. At the 50% correct assessment rate, discriminator model 120 is unable to detect differences between generated example 116 and real example 124, indicating generator model 112 is successfully replicating target domain protocols and formats. For example, if apparatus 100 is being used to translate ECG data from a domain protocol used by an Alivecor device to a domain protocol used by a General Electric ECG device, then static time series image 108 may include the Alivecor ECG data being transferred. Continuing the non-limiting example, real example 124 may contain a plurality of ECG data sets from a General Electric ECG device. Real example 124 may be used as training data to compare and teach both generator model 112 and discriminator model 120. Training data and machine-learning processes are discussed in detail below in reference to FIG. 5.

Still referring to FIG. 1, in the non-limiting embodiment of a GAN, discriminator model 120 may deliver its binary assessment to a binary classifier 128. Binary classifier 128 may be another model, such as a machine-learning and/or neural network classifier, which is configured to identify and deliver an assessment of real or fake back to both generator model 112 and discriminator model 120. Discriminator model 120 is a machine-learning based entity which may rely on binary classifier 128 output as training data to continuously improve its model and ability to detect real versus fake examples. A binary classifier operates based on simple digital logic with an input identifying the source of the example, and an input based on discriminator model's 120 assessment. The binary classifier receives the real or fake assessment from discriminator model 120, identifies whether it is correct or not based on whether the example was fabricated or real then forces either generator model 112 to modify its processes when discriminator model 120 is correct, or it forces discriminator model 120 to modify its processes when discriminator model 120 is wrong. Training data and machine-learning processes are discussed in detail below in reference to FIG. 5.

Still referring to FIG. 1, in the non-limiting embodiment of a GAN, both generator model 112 and discriminator model 120 may make up a generative adversarial network and may be modified based on binary classifier 128 outputs, so that the generator outputs converge over training iterations, to accurate outputs in target domain protocol. As used in this disclosure, a "generative adversarial network" is a machine learning process that includes at least two adverse networks or models configured to synthesize data according to prescribed rules. When discriminator model correctly assesses that generated example 116 is fake, this assessment may force generator model 112 to modify its algorithm. Conversely, if discriminator model 120 falsely identifies a real example as fake, or a generated example 116 as real, discriminator model 120 may then be forced to modify its algorithm. In this way, every iteration may result in one of the two models being modified. This process of generator model 112 producing new generated examples 116 and discriminator model 120 assessing whether the input example is real or fake may iteratively continue until discriminator model 120 settles into a consistent 50% mix of real and fake assessments pertaining to generated example 116. Processor 104 may establish a threshold other than the 50% real versus fake assessments, including establishing a confidence threshold to force continued iterations until generated example 116 reaches a user-specified refinement. A user may, in some non-limiting examples, select a specific number of iterations of discriminator model 120 valuations, a percentage of correct or incorrect discriminator model 120 assessments, or may interject feedback at any point the user decides within the time series conversion process to modify or redirect processor 104. Integrated user feedback may allow user to introduce a manual valuation of generated example 116, which would then be used as a distinct form of training data to guide both generator model 112 and discriminator model 120. A conclusive state may indicate that generator model 112 is outputting generated examples 116 that so closely resemble real examples 124, that discriminator model 120 cannot differentiate what is real and fake. Upon reaching this conclusive state, processor 104 may export dynamic time series data 128.

Still referring to FIG. 1, generator model 112 may be capable of ingesting additional conditional inputs 132 to further bound and define its generated examples 116. As used herein, "conditional inputs" are extra information provided to both generator model 112 and discriminator model 120 to bias the output from both models. Conditional inputs 132 may be in the form of class labels, or data from other domains that user intends to incorporate to some extent within completed dynamic time series data 128. Conditional inputs 132 may include alternate versions of target ECG time series data sets. Additional conditions may further include any data, such as graphical data, used to bias generator model 112. In a non-limiting embodiment conditional input 132 may include a time series data set with different features from either static time series image 108 or target time series data as provided by real example 124. This type of mixing of target data sets may enable a hybrid output which retains the benefits of multiple target time series data sets while shedding the undesirable features of each. Conditional inputs 132 may include a font type, color scheme, sample rate, data range or any other plurality of features user wants apparatus 100 to incorporate into completed time series data 128. In a non-limiting embodiment, user may combine all of the available time series protocols within a specific device type (i.e., ECG, respiratory monitor, glucometer, pulse oximeter, blood pressure monitor, etc.) by entering one of them as static time series image 108, then using all of the others as conditional inputs 132. This type of bulk input may be effective at generating a common domain protocol which could be used as a type of universal translation step such that all initial time series are first translated to a common domain protocol, then subsequently translated to the target domain protocol.

Still referring to FIG. 1, processor 104 may support displaying the output dynamic time series data 128 by itself or alongside static time series image 108. This display may additionally include highlighting or promoting display areas where data was changed, or requires additional action, or any other parts that user may deem important. Display may support user feedback as a whole, or regarding any specific portion of the completed dynamic time series data 128. Display man then display the user feedback alongside the applicable portion. Display may enable user to query the reasoning for a certain output feature and to then interrogate the motivating source, whether it is prior training data, poor input image quality, certain machine-learning process decisions, internal calculations, or other driving causes of the output feature. All user interaction may be used as training data in subsequent operations and may be applied to any and all internal models, for instance and without limitation as described elsewhere in this disclosure.

Still referring to FIG. 1, in a non-limiting embodiment, processor 104 may execute this GAN process bi-directionally. A bi-directional GAN process, which may include without limitation a "CycleGAN" process, may operate by pairing a circuit, hardware and/or software module, and/or processor that works to convert static time series image 108 to dynamic time series data 128, as described above, with a separate circuit, hardware and/or software module, and/or processor, still operating as described above, but in the reverse direction, wherein processor 104 translates completed dynamic time series data 128 back into the initial domain protocol. A bi-directional GAN process may additionally use the same circuit, hardware and/or software module, and/or processor for both directions of translation simultaneously but using a time modulation method wherein the forward direction is conducted for the first half of each second, while the reverse direction is translated during the second half of each second, or any variation of dividing cycles based on time or sequence. Bi-directional GAN may rely on a pair of generators as described above, including without limitation neural network generators, each using outputs of the other as inputs. A bi-directional GAN process may enable forward and backward translation between domains to occur simultaneously, but dependently on each other.

Still referring to FIG. 1, in the non-limiting embodiment of CycleGANs, a CycleGAN processes may include a set of calculations. Training data used in CycleGAN differs from paired training data, wherein paired training data includes training examples $$\{x_i, y_i\}_{i=1}^{N},$$

where the correspondence between $x_i$ and $y_i$ already exists. In unpaired training data, as applied to CycleGAN processes, training data may include a source set $$\{x_i\}_{i=1}^{N} (x_i \in X)$$

and a target set $$\{y_j\}_{j=1}^{M} (y_j \in Y),$$

with no information provided as to which $x_i$ matches which $y_j$. In the case of unpaired data, starting with a time series in domain X and a different time series in domain Y, a general mapping may be enabled such that G:X→Y, wherein the output ŷ=G(x), x∈X and is indistinguishable from time series y∈Y by an adversary trained to classify ŷ apart from y. CycleGAN processes may require that a translator operating in the reverse direction of a separate translator produce exactly inverse results such that G:X→Y and F:Y→X, or in other words G and F are inverses of each other. A distinguisher $D_x$ as described above may operate as a distinguisher between time series {x} and translated time series {F(y)}. Conversely, a distinguisher $D_y$ as described above may operate as a discriminator between {y} and {G(x)}. An adversarial loss may be applied to both mapping functions such that:

$$\mathcal{L}_{GAN}(G,D_Y,X,Y)=\mathbb{E}_{y\sim p_{data}(y)}[\log D_y(y)]+\mathbb{E}_{x\sim p_{data}(x)}[\log(1-D_y(G(x))]$$

This process may be repeatable in a reverse direction and incentivized by reducing cycle consistency loss such that:

$$\mathcal{L}_{cyc}(G,F)=\mathbb{E}_{x\sim p_{data}(x)}[\|F(G(x))-x\|_1]+\mathbb{E}_{y\sim p_{data}(y)}[\|G(F(y))-y\|_1].$$

An end result may be summarized by:

$$\mathcal{L}(G,F,D_X,D_Y)=\mathcal{L}_{GAN}(G,D_Y,X,Y)+\mathcal{L}_{GAN}(F,D_X,Y,X)+\lambda \mathcal{L}_{cyc}(G,F),$$

where λ controls relative importance of objectives. Adversarial losses may be used in iterative steps to reduce bi-directional translation differences such that a process aims to replicate static time series image 108 after converting it both in a forward direction to target domain protocol, then back to initial domain protocol. This validation process may rely on a confidence threshold whereby machine-learning processes use available training data to assess a level of match between static time series image 108 and final, retranslated time series data after it has undergone both forward and reverse translations.

Still referring to FIG. 1, in a separate non-limiting embodiment, processor 104 may execute the conversion of the at least a time series from the initial domain protocol to a target domain protocol using an unsupervised generative machine-learning process by using a diffusion-based machine-learning process. A "diffusion-based process," as used in this disclosure, is a generative process that initially introduces randomly sampled noise to a data set, then trains itself to recover the data by reversing the noise introduction. Diffusion-based process may include, without limitation, a stochastic differential equation (SDE) process, such as without limitation an energy-guided stochastic differential equation (EGSDE) process. In the non-limiting embodiment of an EGSDE diffusion-based model, EGSDE may rely on a score-based diffusion model (SBDM) to translate time series data from one domain to another. EGSDE's may use SBDMs to perturb the initial time series data to noise, such as without limitation Gaussian noise, then reverse the process to transform the noise back to the data distribution. This diffusion model may adapt a pretrained energy function based on data from initial source domain and data from final target domain to guide an inference process of a pretrained stochastic differential equation (SDE). As used herein, "energy function" is defined as a formulaic approximation of a transfer function to convert time series data from a source domain to usable data within a target domain. Energy function may be composed of two terms. A first guiding term is a "realistic expert," which is a term that prioritizes an energy function's focus on discarding source domain-specific features. A second guiding term is a "faithful expert," which is a term that prioritizes an energy function's focus on preserving domain-independent features. Combination of these two functions may result in a target domain data set agnostic of source domain data protocols, but which retains substantive features a source time series data manifested. In combination with a pretrained energy function, EGSDE methods may employ three experts (energy function, realistic expert, faithful expert) to contribute to generating a best fit output time series data in target domain protocol. A mathematical explanation of this process is described in detail: Let $q(y_0)$ be the unknown data distribution on $\mathbb{R}^D$. A forward diffusion process $\{y_t\}_{t\in[0,T]}$, indexed by time t, may then be represented by the following forward SDE:

$$dy=f(y,t)dt+g(t)dw,$$

where $w\in\mathbb{R}^D$ may be a standard Wiener process and/or other adaptive or stochastic filtration process, $f(\cdot,t):\mathbb{R}^D\to\mathbb{R}^D$ is a drift coefficient and $g(t)\in\mathbb{R}$ is a diffusion coefficient. As used herein, a "Wiener process" is a filter used in signal processing such that an estimate of a target domain may be produced using linear time-invariant filtering of a noisy process, by assuming a known stationary signal. In an embodiment, other adaptive and/or stochastic filtration processes may include least mean squared processes, least squares processes, frequency domain adaptive filters, or any other applicable filter. As used herein, an "adaptive filter" is a system with a filter having a transfer function controlled by variable parameters and a means to adjust those parameters according to an optimization algorithm and/or equation, such as without limitation a least mean squares, least squares, frequency domain adaptive, and/or Weiner equation and/or process. The f(y,t) and g(t) may be related to noise size and may determine a perturbation kernel $q_{t|0}(y_t|y_0)$ from time 0 to t. If we allow $q_t(y)$ to be a marginal distribution of SDE at time t, its time reversal may then be described by a separate SDE:

$$dy=[f(y,t)-g(t)^2\nabla_y \log q_t(y)]dt+g(t)d\bar{w},$$

where $\bar{w}$ signifies a reverse-time standard Wiener process or other adaptive and/or stochastic process, and dt represents an infinitesimal negative timestep. Then a score-based model, s(y,t), may be adopted to approximate an unknown $\nabla_y \log q_t(y)$ by score matching, and thereby inducing a SBDM, which is defined by an SDE:

$$dy=[f(y,t)-g(t)^2 s(y,t)]dt+g(t)d\bar{w}.$$

This may then be discretized using a Euler-Maruyama solver. By formally adopting a step size of h, the iteration rule from s to t=s−h is:

$$y_t=y_s-[f(y_s,s)-g(s)^2 s(y_s,s)]h+g(s)\sqrt{h}z, z\sim \mathcal{N}(0,I).$$

Still referring to FIG. 1, and still in reference to the non-limiting embodiment of a diffusion-based machine-learning process using EGSDE, using a set of unpaired data elements from the source domain $\chi\subset\mathbb{R}^D$ and the target domain $\gamma\subset\mathbb{R}^D$ as the training data, the goal is to transfer the original time series data from the source domain to the target domain. This goal may be accomplished by designing a distribution $p(y_0|x_0)$ on a target domain γ conditioned on a time series $x_0\in\chi$ to transfer. Translated time series data may be realistic for target domain by changing domain-specific features and faithful for source time series by preserving domain-independent features. An iterative latent variable refinement (ILVR) may then use a diffusion model on the target domain for realism. An ILVR starts from $y_T\sim\mathcal{N}(0, I)$ and samples from the diffusion model, described immediately above, for $y_T$. To promote faithfulness, $y_T$ may be further refined by adding a residual between the sample $y_T$ and the perturbed source image $x_T$ through a non-trainable low-pass filter:

$$y_T \leftarrow y_T + \phi(x_t) - \phi(y_t), x_t \sim q_{t|0}(x_t|x_0),$$

where $\phi(\cdot)$ is a low-pass filter and $q_{t|0}(\cdot|\cdot)$ is a perturbation kernel determined by forward SDE. A valid conditional distribution $p(y_0|x_0)$ may be defined by compositing a pretrained SDE and a pretrained energy function under mild regularity conditions as follows:

$$dy = [f(y,t) - g(t)^2 (s(y,t) - \nabla_y \varepsilon(y,x_0,t))] dt + g(t) d\bar{w},$$

where $\bar{w}$ is a reverse-time standard Wiener process, dt is an infinitesimal negative timestep such that $s(\cdot|\cdot): \mathbb{R}^D \times \mathbb{R} \to \mathbb{R}^D$ is the score-based model in pretrained SDE and $\varepsilon(\cdot,\cdot,\cdot): \mathbb{R}^D \times \mathbb{R}^D \times \mathbb{R} \to \mathbb{R}$ is the energy function. From there, a start point, $y_m$, may be sampled from perturbation distribution $q_{M|0}(y_M|x_0)$, where user may set M=0.5 T. Transferred time series data may be obtained by taking samples at endpoint t=0 following SDE.

Still referring to FIG. 1, and still in reference to the non-limiting embodiment of a diffusion-based machine-learning process relying on EGSDE, an energy function may be derived by balancing a need to retain domain-independent features of static time series image 108, while appropriately altering domain-specific features. Based on this balance, an energy function may be expressed as a sum of two log potential functions:

$$\varepsilon(y,x,t) = \lambda_s \varepsilon_s(y,x,t) + \lambda_i \varepsilon_i(y,x,t) = \lambda_s \mathbb{E}_{q_{t|0}(x_t|x)} S_s(y,x_t,t) - \lambda_i \mathbb{E}_{q_{t|0}(x_t|x)} S_i(y,x_t,t),$$

where $\varepsilon_i(\cdot,\cdot,\cdot): \mathbb{R}^D \times \mathbb{R}^D \times \mathbb{R} \to \mathbb{R}$ and $\varepsilon_s(\cdot,\cdot,\cdot): \mathbb{R}^D \times \mathbb{R}^D \times \mathbb{R} \to \mathbb{R}$ are the log potential functions, $x_t$ is the perturbed source image in the forward SDE, $q_{t|0}(\cdot|\cdot)$ is the perturbation kernel from time 0 to time t in the forward SDE, $S_s(\cdot,\cdot,\cdot): \mathbb{R}^D \times \mathbb{R}^D \times \mathbb{R} \to \mathbb{R}$ and $S_i(\cdot,\cdot,\cdot): \mathbb{R}^D \times \mathbb{R}^D \times \mathbb{R} \to \mathbb{R}$ are functions measuring similarity between the source time series and the perturbed time series, and $\lambda_s \in \mathbb{R}_{>0}$ are weighting hyperparameters. To specify $S_s(\cdot,\cdot,\cdot)$, a time-dependent domain-specific feature extractor $E_s(\cdot,\cdot): \mathbb{R}^D \times \mathbb{R} \to \mathbb{R}^{C \times H \times W}$, where C, H, and W are specific feature descriptors of the output, may be used; $E_s(\cdot,\cdot)$ represents the all but last layer of a classifier trained on both domains to predict whether a time series is from the source domain or the target domain, while $S_s(\cdot,\cdot,\cdot)$ is defined as the cosine similarity between features, which may be implemented without limitation as vectors, extracted from generated example 116 and static time series image 108 as follows:

$$S_S(y, x_t, t) = \frac{1}{HW} \sum_{h,w} \frac{E_s^{hw}(x_t, t)^T E_s^{hw}(y, t)}{\|E_s^{hw}(x_t, t)\|_2 \|E_s^{hw}(y, t)\|_2},$$

where $E_s^{hw}(\cdot,\cdot) \in \mathbb{R}^C$ denotes specific source features. $S_i(\cdot,\cdot,\cdot)$ may be specified by introducing a domain-independent feature extractor, $E_i(\cdot,\cdot): \mathbb{R}^D \times \mathbb{R} \to \mathbb{R}^D$, which may operate as a low-pass filter preserving domain-independent features and discarding domain-specific features. $S_i(\cdot,\cdot,\cdot)$ may be further defined as a negative squared $L_2$ distance between features extracted from generated example 116 and static time series image 108 as follows:

$$S_i(y,x_t,t) = -\|E_i(y,t) - E_i(x_t,t)\|_2^2.$$

A more sophisticated $E_i$, beyond operating as a low-pass filter, may be employed to disentangle learning methods of the separate domains.

Still referring to FIG. 1, and still in reference to the non-limiting embodiment of a diffusion-based machine-learning process using EGSDE, solving an energy-guided reverse-time SDE may be accomplished using a pretrained score-based model s(y,t) and energy function, $\varepsilon(y,x,t)$, to create generated example 116 from conditional distribution $p(y_0|x_0)$. A fair comparison may be achieved using numerical solvers to approximate trajectories from SDEs. As a non-limiting embodiment, a Euler-Maruyama solver may be used, adopting a step size, h, where the iteration rule from s to t=s−h may be characterized by:

$$y_t = y_s - [f(y,s) - g(s)^2(s(y_s,s) - \nabla_y \varepsilon(y_s,x_0,s))]h + g(s)\sqrt{h}z, z \sim \mathbb{N}(0,I).$$

A Monte Carlo method may be used to estimate an expectation of a single sample for efficiency. In a non-limiting embodiment, a variance preserve energy-guided SDE may be used to modify the noise prediction network and take it into the sampling procedure in denoising diffusion probabilistic models.

Still referring to FIG. 1, and still in reference to the non-limiting embodiment of a diffusion-based machine-learning process using EGSDE, a product of experts may be used for a discretized sampling process. A conditional distribution at time, t, may be defined as:

$$\tilde{p}(y_t \mid x_0) = \frac{p_{r1}(y_t \mid x_0) p_e(y_t \mid x_0)}{Z_t},$$

where $Z_t$ is a partition function, $p_e(y_t|x_0) \propto \exp(-\varepsilon(y_t, x_0, t))$ and $p_{r1}(y_t|x_0)$ is a marginal distribution at time t, based on a pretrained SDE on the target domain. A transition kernel, $\tilde{p}(y_t|y_s)$, may be constructed based on the desirable equilibrium, $\tilde{p}(y_t|x_0) = \int \tilde{p}(y_t|y_s) \tilde{p}(y_s|x_0) dy_s$, where t=s−h:

$$\tilde{p}(y_t \mid y_s) = \frac{p(y_t \mid y_s) p_e(y_t \mid x_0)}{\tilde{Z}_t(y_s)},$$

where $\tilde{Z}_t(y_s)$ is a partition function and $p(y_t|y_s) = \mathbb{N}(\mu(y_s, h), \Sigma(s, h)I)$ is a transition kernel of a pretrained SDE. Using a Taylor expansion around $\mu(y_s, h)$ to approximate low curvature values of $\varepsilon(y_t, x_0, t)$, the following may be obtained:

$$\tilde{p}(y_t|y_s) \approx \mathbb{N}(\mu(y_s,h) - \Sigma(s,h)\nabla_y \varepsilon(y',x_0,t)|_{y'=\mu(y_0,h)}, \Sigma(s,h)I).$$

Solving an energy-guided SDE in a discretization manner may be approximated by sampling from a product of experts as described at the beginning of this paragraph. A conditional distribution, initially defined in the beginning of this paragraph, may be rewritten as:

$$\tilde{p}(y_t \mid x_0) = \frac{p_{r1}(y_t \mid x_0) p_{r2}(y_t \mid x_0) p_f(y_t \mid x_0)}{Z_t},$$

where $p_{r2}(y_t|x_0) \propto \exp(-\lambda_s \varepsilon_s(y_t, x_0, t))$, $p_f(y_t|x_0) \propto \exp(-\lambda_i \varepsilon_i(y_t, x_0, t))$. With t=0, transferred samples approximately follow a distribution defined by a product of three experts, where $p_{r1}(y_t|x_0)$ and $p_{r2}(y_t|x_0)$ operate as a realism experts and $p_f(y_t|x_0)$ is a faithful expert, corresponding to a score function s(y, t) and log potential functions $\varepsilon_s(y, x, t)$ and $\varepsilon_i(y, x, t)$, respectively.

Further referring to FIG. 1, processor 104 may be capable of ingesting additional conditional inputs 132 to further bound and define its generated examples 116 in CycleGAN and Diffusion-Based processes in the same way discussed above for GAN processes. As used herein, "conditional inputs" are extra information provided to both generator model 112 and discriminator model 120 to bias the output from both models. Conditional inputs 132 may be in the form of class labels, or data from other domains that user intends to incorporate to some extent within completed time series data 132. Conditional inputs 132 may include alternate versions of target ECG time series data sets. Additional conditions may further include any graphical data user intends to bias generator model 112. In a non-limiting embodiment conditional input 132 may be a time series data set with different features from either static time series image 108 or the target time series data as provided by real example 124. This type of mixing of target data sets may enable a hybrid output which retains the benefits of multiple target time series data sets while shedding the undesirable features of each. Conditional inputs 132 may include a font type or color scheme user wants apparatus 100 to incorporate.

Still referring to FIG. 1, processor 104 is configured to accept multiple static input images wherein the at least a time series comprises a first time series including a first static image in a first static image format and a second time series in a second static image format; and the second static image format is distinct from the first static image format. In a non-limiting embodiment, multiple time series static images may be required to be combined and translated to a single target domain protocol output. In these cases, processor 104 may convert each of first and second static image time series into a common domain protocol before then combining the data sets and, if necessary, converting the combined translation into the user-selected target domain protocol. These processes may be executed as described above, except that the combination of the two distinct datasets may rely on a separate set of training data and/or user feedback in order to accurately coalesce the data into a single target domain dynamic time series data 128 output. In a non-limiting embodiment, the two distinct static time series image 108 inputs may contain information from the same time series, but due to machine limitations, were exported from the time series machine in multiple pages. In a separate non-limiting embodiment, the time series collection mechanism may have needed to be replaced mid-collection, such that the replacement time series collection mechanism began collecting the same time series data immediately after the replaced time series collection mechanism and each machine exports a distinctly formatted static time series image 108.

Still referring to FIG. 1, processor 104 is configured to generate training data to improve its operations and output quality. Generating training data using converted static time series may involve generating a plurality of training examples correlating input data to output data as a function of at least an input and at least an expected output. In a non-limiting embodiment, this training data may be provided by user feedback in reference to a completed time series conversion. User feedback may be positive, causing an executed time series conversion process to be validated and promoted for future applications. User feedback may be negative, causing an executed time series conversion process to be invalidated and suppressed for future applications. User may alternatively or additionally generate training data in reference to specific aspects of the conversion process. In a non-limiting embodiment, any domain feature from initial static image or target domain protocol may be corrupted, ignored, overly emphasized, or misinterpreted. Processor 104 may accept feedback to specifically address these types of deficient conversion. In the case of feedback on a specific domain feature and its proper or improper use, processor 104 may make minor alterations to the relevant machine-learning process to apply corrections to future conversion processes. In this way, processor 104 may continually modify its input data to output data relationship. Training data may also be in the form of prior time series conversions. Where successful, no additional user input is necessary. Training data may also use failed prior time series conversions, in conjunction with user feedback addressing the specific failure mechanism such that processor 104 and machine-learning processes may be improved to embrace the correct conversions and reject the method used in the failed conversions.

Continuing to refer to FIG. 1, training of a machine-learning model using training data and at least an analytical process may be based on at least an input and at least an expected output. As used herein, an "analytical process" refers to an analysis or series of analyses to identify patterns, relationships, and meaning within sets of data. In a non-limiting embodiment, a static time series image 108 may be initially assessed as random noise through heuristic processing, and after multiple iterations identify a waveform. After many subsequent iterations, the analytical process may identify a coronary artery disease condition based on the static time series image 108 being an ECG and the analytical process relied on training data covering the various diagnosable conditions from an ECG. In cases where a diagnosis is subsequently confirmed by the user, that diagnosis and affiliated time series data may be used as training data in subsequent operations. In a separate non-limiting embodiment, analytical processing may enable use of a classifier to label different ECG time series waveform elements as different types of cardiac rhythms or events. In reference to a generative model, input may be static time series image 108, while expected output may be real example 124, or any other validated target domain into which time series data may be converted. Training data may also be in the form of prior time series conversions. Where a conversion is successful, no additional user input may be provided. Training data may also use failed prior time series conversions, in conjunction with user feedback addressing a specific failure mechanism such that processor 104 and machine-learning processes may be improved to embrace the correct conversions and reject the method used in the failed conversions. These types of input to output correlations built over numerous conversions train a machine-learning model to apply appropriate methods dependent on static time series image 108 and target domain requirements.

Still referring to FIG. 1, processor 104 may direct retention of any or all collected data to either a local hard drive, or to a remote storage location such that the data may be immediately accessible at any time after initial ingestion. Storage of this data may enable subsequent machine-learning training and may additionally enable a more thorough understanding by the user of logic employed by processor 104. In a non-limiting embodiment, storing of ECG data may enable the data to be subsequently converted to alternative formats, be copied, transmitted, and further evaluated. In a separate non-limiting embodiment, storage of the data may allow for it to be translated to a separate output format which may have additional analysis capabilities at a later time.

Still referring to FIG. 1, processor 104 may support validation of the dynamic time series data 128 or longer duration time series 136. In a non-limiting embodiment, in reference to an ECG, this validation may involve an evaluation of the generated output by processor 104 with regard to the time series amplitude, peak voltage, wavelength, and other electrical characteristics. Processor 104 may then verify accuracy of the output as compared to the input static time series image 108. Processor 104 may rely on image correlation processes to recognize and correct any minor defective conversion inaccuracies. Where a remedial correction is not readily identifiable, processor 104 may prompt the user to select the corrective action from a list, or to manually execute the requisite correction. Any provided user feedback in this process may be used as training data in subsequent operations. Error correction may be implemented as discussed above or may include a separate machine-learning model. In a non-limiting embodiment, processor 104 may employ a separate model solely to resolve detected errors. This error correction module may store and employ training data from prior error correcting engagements, especially where the user has validated a specific corrective action implemented. The error correction module may additionally rely on training data from other aspects of processor 104 and the time series conversion operations, including but not limited to uses of real example 124 or conditional inputs 132, previously accepted successful time series conversions with or without error corrections, or prior identified outlier datapoints. Furthermore, processor 104 may enable user to select the extent to which processor 104 should employ automated error correction. In a non-limiting embodiment, user may select "no automated error correction" wherein processor 104 would not correct any identified errors but would track and relay the identified errors to the user. Conversely, user may select "full automated error correction" wherein processor 104 would employ its best approximation of an error correction for every identified error in the time series data. The best approximation of an error correction may be based on a generative machine-learning model, prior training data including user feedback, or other mathematical analysis. Training data is discussed in detail in reference to FIG. 5 below.

Still referring to FIG. 1, processor 104 may be configured to deliver the validated conversion to an external machine-learning model as training data. In a non-limiting embodiment, the external machine-learning model may incorporate additional patient-clinician interactions, EHR data, prescriptions, and any additional information that may support a clinical diagnosis. This machine-learning model may then be used to assess and propose diagnoses based on training data, internal ECG analyses, and assessed probabilities for each disease. In a non-limiting example, machine-learning based diagnoses, as described within this disclosure may be the same or substantially the same as the ECG-Based Cardiac Ejection-Fraction Screening described in U.S. patent application Ser. No. 16/754,007, filed on Oct. 4, 2018, titled "ECG-BASED CARDIAC EJECTION-FRACTION SCREENING," which is incorporated by reference herein in its entirety.

Still referring to FIG. 1, in the non-limiting embodiment described in the preceding paragraph, the received static time series image 108 may be received in a PDF format wherein the ECG time series may be plotted as a Small Web Format, or a Shockwave Flash File. These formats may contain a quantified time series plot, wherein the conversion to a dynamic time series data 128 may be as simple as a formatting conversion. Delivery of the converted dynamic time series data 128 to the external machine-learning model may still be incorporated in order to train a diagnosing algorithm based on the ECG data.

Still referring to FIG. 1, instantiation of a machine-learning model may be performed on an analytical circuit device. Instantiation of the machine-learning model can be done using hardware rather than software by running the same inputs through a chip where, through transistor gating, the chip executes the same functions as the software would have. The chip can be updated in some cases (e.g., an FPGA can be "configured" to change its circuitry). This instantiation is discussed in detail below in reference to FIG. 5.

Still referring to FIG. 1, processor 104 may be configured to generate a summary and/or recommendation based on the converted time series and machine-learning training data available. In a non-limiting environment, a converted ECG time series may reveal a readily identifiable condition of atrial fibrillation, wherein processor 104 may notify the user separately or draw attention to this characteristic in the output. In a separate non-limiting embodiment, a converted time series may contain irregularities and/or outlier data which, based on training data and pattern recognition, processor 104 may generate a warning or notification prompt for the user based on this potential flaw. As training data and human confirmation of the internal processing and analysis expands, processor 104 may support making more informed recommendation/diagnosis 140. These recommendations/diagnoses may be used for further human analysis, or may be used to categorize the output dynamic time series data 128 for downstream processing. In the case of a diagnosis, especially prior to extensive training data and human feedback, these outputs may be treated as clinical suggestions rather than reliable, verified medical direction.

All operations and machine-learning processes discussed above may be instantiated completely within processor 104, partially within processor 104 and partially distributed across a neural network or may be completely instantiated within a neural network. Neural networks and their applicability to the disclosure herein are described in detail below in reference to FIGS. 6-7. Instantiation of the machine-learning model is discussed in detail below in reference to FIG. 5.

Figure 2:
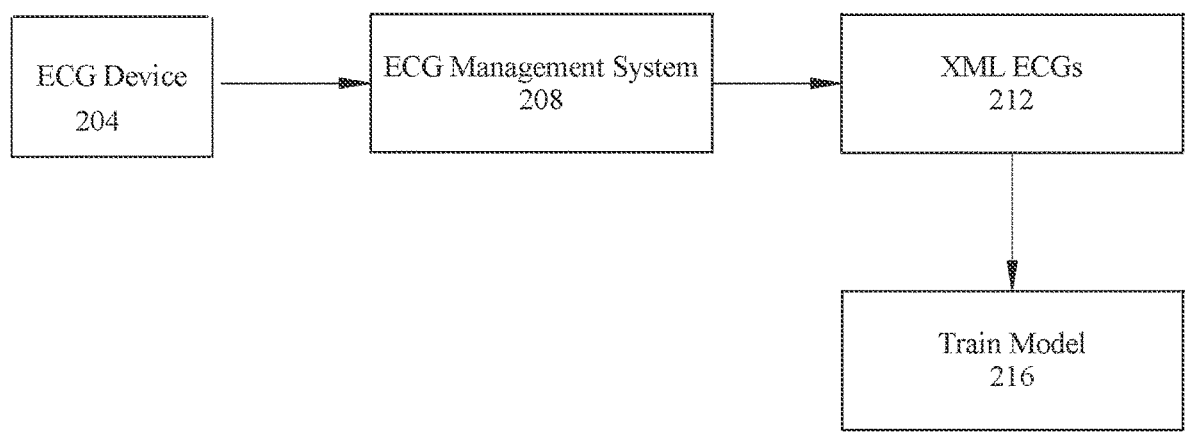
FIG. 2 is an example flow diagram of an ECG Management System being used to train a machine-learning model.

Referring now to FIG. 2, a flow diagram of an ECG Management System being used to train a machine-learning model is illustrated. In a non-limiting embodiment, where an ECG Device 204 may generate time series data, that data may be delivered as the quantified and interrogable dynamic data set and processed by an ECG Management System 208. Where an ECG Management System 208 is available, it may be relied upon to extract numeric data directly from the ECG Device 204 and convert it to an XML ECG 212 which may then be used by a Train Model 216 step. The XML ECG 212 may be converted to alternate formats which retain the quantified data to be stored, interpreted or analyzed as determined by the user.

Figure 3:
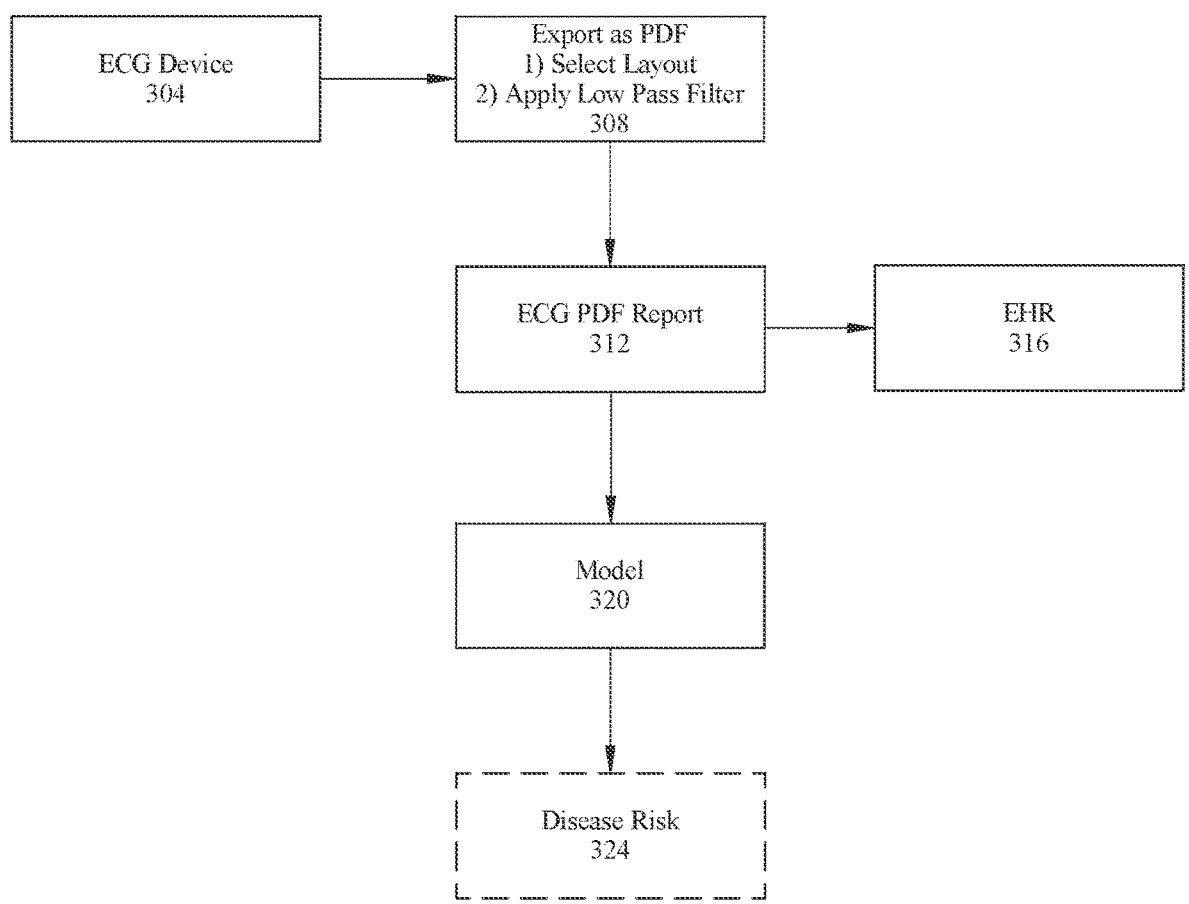
FIG. 3 is a flow diagram of a method to train a model with no ECG Management System interface.

Referring now to FIG. 3, a flow diagram of a method to train a model with no ECG Management System interface is illustrated. In a non-limiting embodiment, ECG Device 304 may unilaterally export the time series data in PDF Form with limited options as shown in Step 304. The generated ECG PDF Report 312 that is exported may then be stored as an Electronic Health Record (EHR) 316. The generated ECG PDF Report 312 may be used within a Model 320, as discussed extensively above. Model 320, with sufficient training data, may generate specific Disease Risk 324 profiles based on Model 320 analyses. These Disease Risk 324 may then support precise treatment plans.

Figure 4:
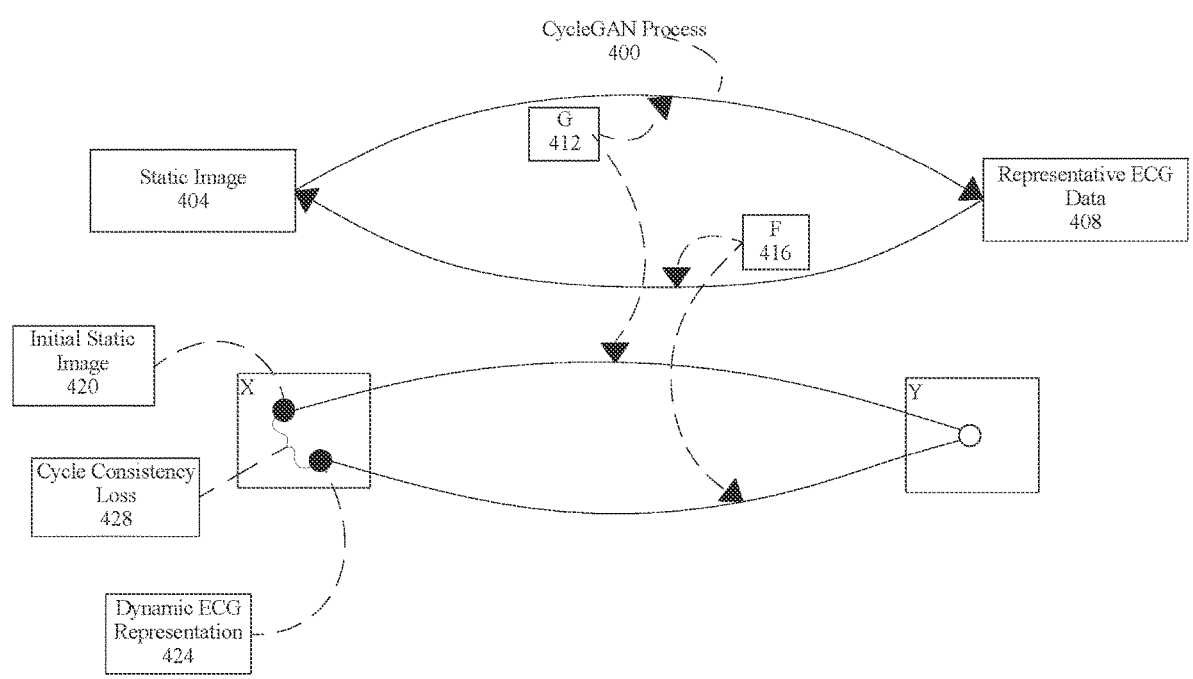
FIG. 4 is a flow diagram of a GAN process.

Referring now to FIG. 4, a block diagram of a non-limiting embodiment of a CycleGAN process 400 is illustrated. CycleGANs, as used within this disclosure, are processes used to translate back and forth between time series from one source to another. Static image 404 represents data from source 1 (e.g., ECG printout), representative ECG data 408 represents data from source 2 (e.g., Apple watch). G 412 and F 416 represent forward (source 1 to source 2) and backward (source 2 to source 1) generators, respectively, translating one source to another. Initial static image 420 is converted to the dynamic ECG format through forward function G 412. That same data set is then translated back to the format of initial static image 420 through backward function F 416. Ideally, this process reproduces an exact replica of initial static image 420. But for many iterations, dynamic ECG representation 424 may be offset from initial static image 420. In these cases, the generated offset is referred to as cycle consistency loss 428. The measure of cycle consistency loss 428 is used as training data to update the models contained within forward function G 412 and backward function F416, with the final goal being to reduce cycle consistency loss 428 to negligible or zero.

Figure 5:
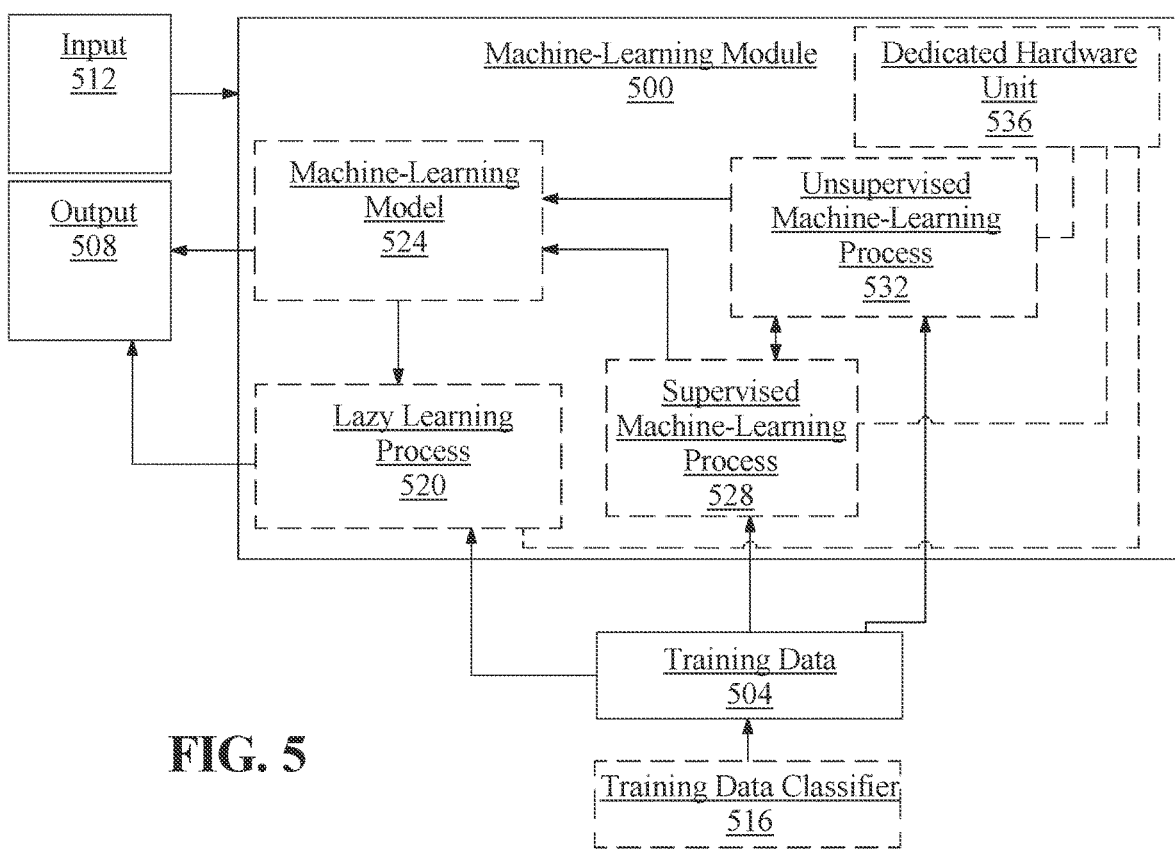
FIG. 5 is a block diagram of an exemplary machine-learning process.

Referring now to FIG. 5, an exemplary embodiment of a machine-learning module 500 that may perform one or more machine-learning processes as described in this disclosure is illustrated. Machine-learning module 500 may perform determinations, classification, and/or analysis steps, methods, processes, or the like as described in this disclosure using machine-learning processes. A "machine-learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine-learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, also known as "training examples," which may be in the form of binary classifications of examples as real or fake, wherein a correct assessment of fake would cause generator model to update its internal algorithms to produce more convincing examples. Similarly an incorrect assessment of real would cause discriminator model to improve its detection and classification internal algorithms. No matter the result, every iteration of discriminator model assessing a generated example will produce training data to adapt one of either generator model or discriminator model. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may also include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data. These types of data entries may be used to provide the real-world examples representative of the target domain time series data protocols and formats.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a process whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors (KNN) classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to an Apple watch time series data set but exclude those classifiers from other inappropriate device types.

Still referring to FIG. 5, in some implementations, machine-learning techniques such as gradient descent, including batch gradient descent or stochastic gradient descent, may be used to train the machine-learning model 524. The machine-learning process may be performed by processor 104, or a separate, but communicatively connected system. In a non-limiting embodiment, the system may obtain a set of multiple training data pairs, wherein each pair may include PDF printout of an ECG of a specified patient and a dynamic time series output from the exact same time period that characterizes a particular patient's ECG. In some cases, the model may be trained on data from many different patients. The training system may select a first training data pair for processing. Machine-learning module 500 may correlate the pairs of training data based on ECG voltages and timing both at individual data points as well as compared to varying larger sample sizes. Although the machine-learning model 524 may be trained on a large dataset, the model itself may be relatively compact. After training, the model may be relatively compact and able to convert characteristics with less computational demand than may have been required during training. This machine-learning process may incorporate either or both supervised and unsupervised training methods.

With further reference to FIG. 5, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as time series data, images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 5, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more detected blurs. Detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures blurriness based on the gradient or first derivative of an image, based on the hypothesis that rapid changes indicate sharp edges in the image, and thus are indicative of a lower degree of blurriness. Blur detection may be performed using a Wavelet-based operator, which takes advantage of the capability of coefficients of the discrete wavelet transform to describe the frequency and spatial content of images. Blur detection may be performed using statistics-based operators to take advantage of several image statistics as texture descriptors in order to compute a focus level. Blur detection may be performed by using discrete cosine transform (DCT) coefficients in order to compute a focus level of an image from its frequency content.

Continuing to refer to FIG. 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by up-sampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs down-sampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been down-sampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 5, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform down-sampling on data. Down-sampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine-learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a KNN, a lazy naïve Bayes algorithm, or the like. Persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a data structure representing and/or instantiating a mathematical and/or algorithmic representation of a relationship between inputs and outputs, as generated using any machine-learning process including without limitation any process as described above and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. With regard to the current disclosure, both generator model and discriminator model are machine-learning models as described above.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to FIG. 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 5, machine-learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create machine-learning model 524 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task LASSO model wherein the norm applied in the least-squares term of the LASSO model is the Frobenius norm amounting to the square root of the sum of squares of all terms. Linear regression models may include the elastic net model, a multi-task elastic net model, a least angle regression model, a LARS LASSO model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes machine-learning model 524 may be configured using a Naïve Bayes classification algorithm as discussed above in reference to FIG. 1.

Still referring to FIG. 5, machine-learning model 524 may be configured using a KNN algorithm. A "K-nearest neighbors algorithm" as used in this disclosure, includes a classification method that utilizes feature similarity to analyze how closely out-of-sample features resemble training data to classify input data to one or more clusters and/or categories of features as represented in training data; this may be performed by representing both training data and input data in vector forms, and using one or more measures of vector similarity to identify classifications within training data, and to determine a classification of input data. KNN algorithm may include specifying a K-value determining the most common classifier of the entries in the database and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 5, generating KNN algorithm may generate a first vector output containing a data entry cluster, generating a second vector output containing input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number experience of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as, without limitation, Field Programmable Gate Arrays (FPGAs), production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 5, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 5, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 5, one or more processes or algorithms described above may be performed by at least a dedicated hardware unit 536. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 536 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 536 may include, without limitation, graphical processing units (GPUs), dedicated signal processing modules, FPGA or other reconfigurable hardware that has been configured to instantiate parallel processing units for one or more specific tasks, or the like. A computing device, processor, apparatus, or module may be configured to instruct one or more dedicated hardware units 536 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 6:
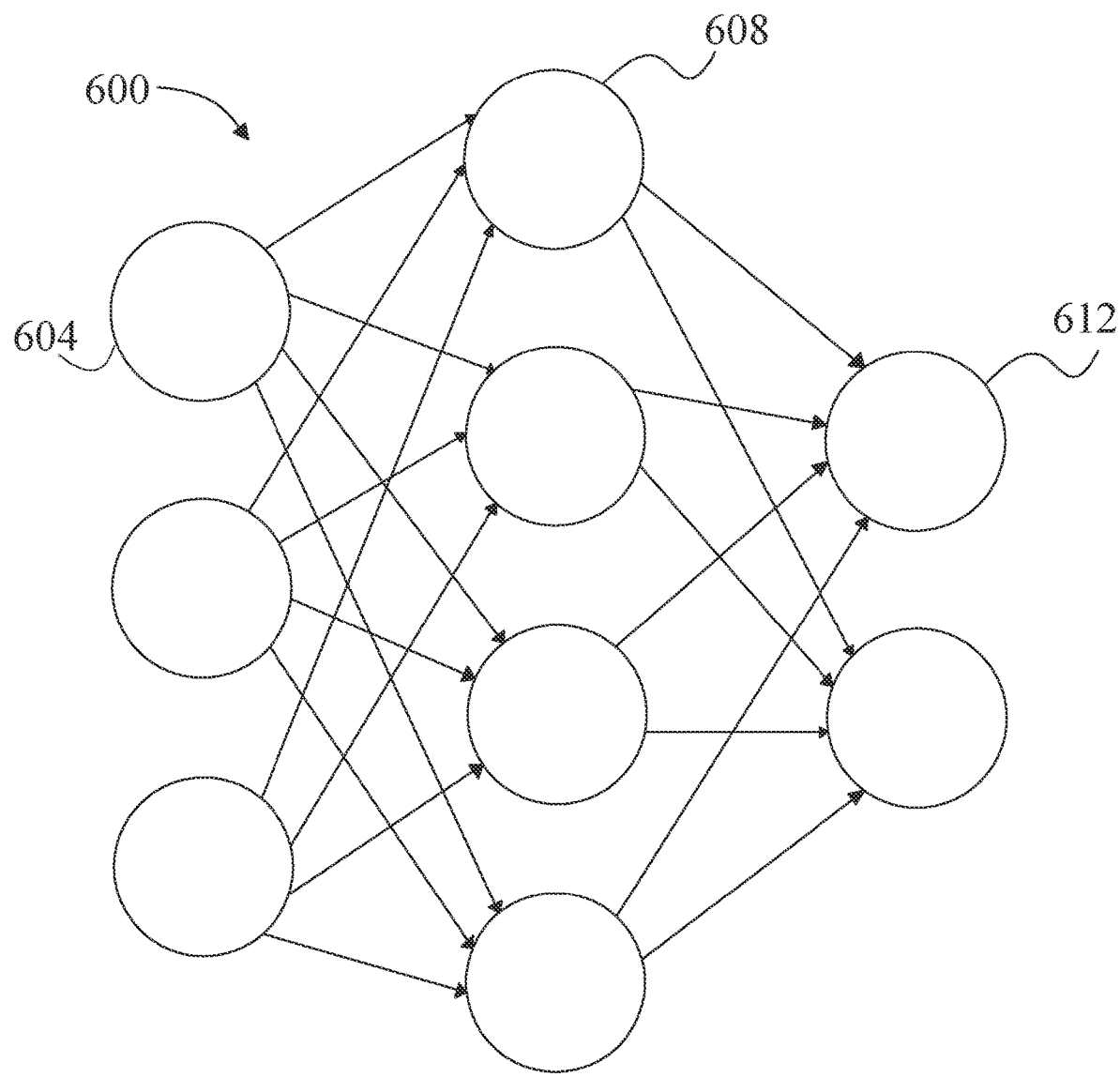
FIG. 6 is a diagram of an exemplary embodiment of a neural network.

Referring now to FIG. 6, an exemplary embodiment of neural network 600 is illustrated. A neural network 600, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

With continued reference to FIG. 6, in a non-limiting embodiment, a neural network may be built around the multitude of simultaneously operational or standby ECG devices and their affiliated networks. Each individual ECG device may be an input node 604, intermediate node 608, output node 612, or a combination of the three as applicable. In cases where bandwidth or data is limited, the remote devices would be primarily input nodes and the majority of processing by machine-learning model would be done remotely. To optimize system operation, machine-learning model may dictate certain remote devices manage the processing to minimize time expended in the analysis and provide feedback to user as close to real-time as possible.

Figure 7:
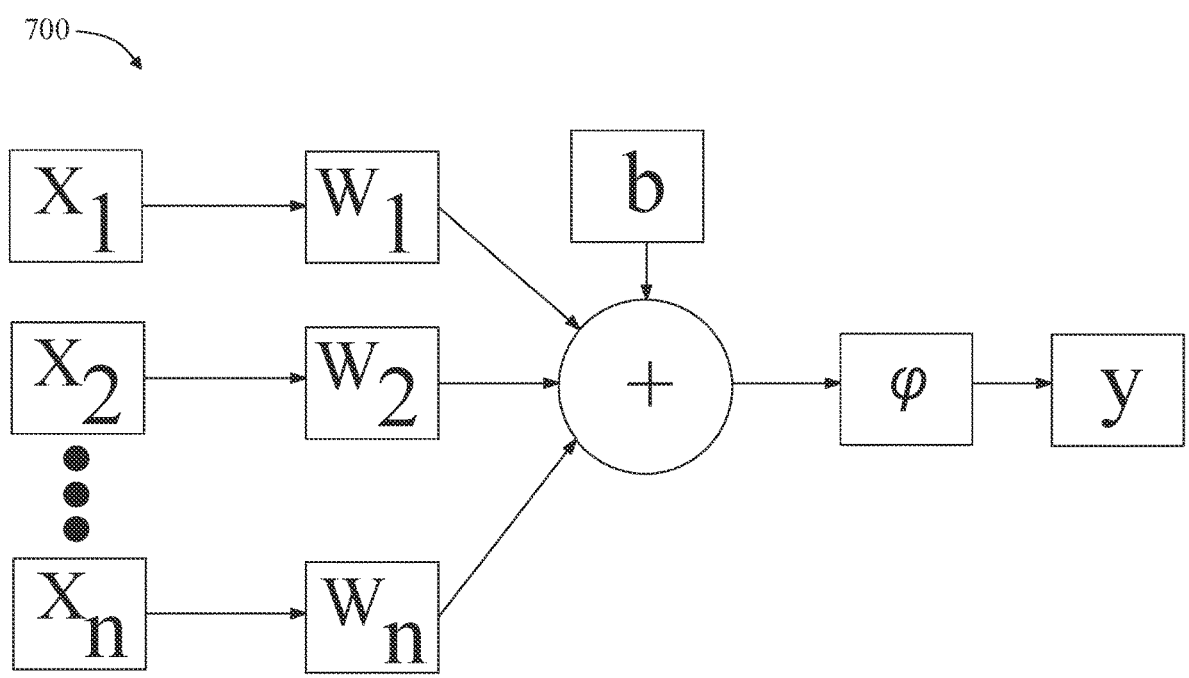
FIG. 7 is a diagram of an exemplary embodiment of a node of a neural network.

Referring now to FIG. 7, an exemplary embodiment of a node of a neural network is illustrated. A node may include, without limitation, a plurality of inputs xi that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 8:
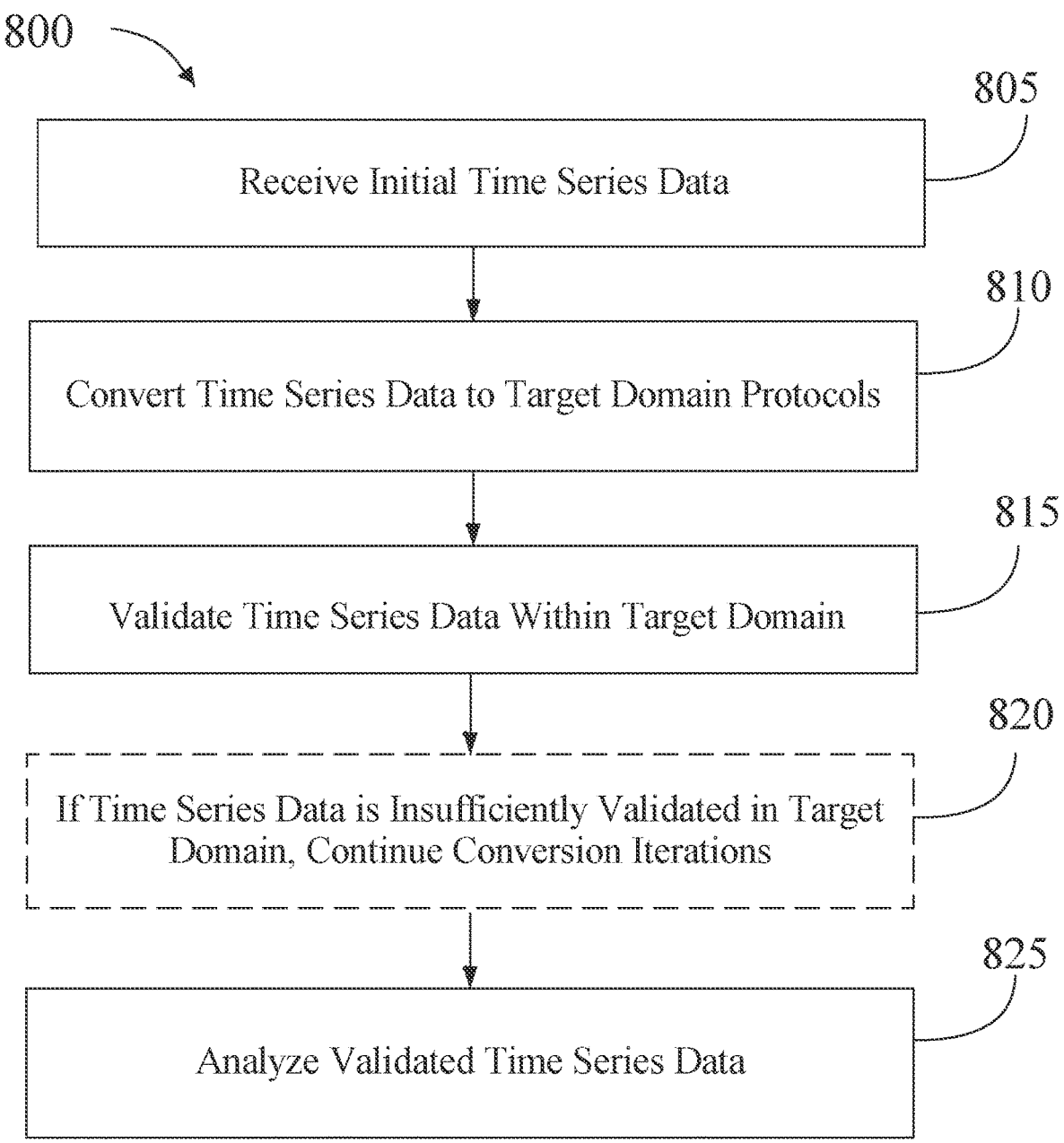
FIG. 8 is a flow diagram of an exemplary method for unpaired time series to time series translation.

Referring now to FIG. 8, a flow diagram of an exemplary method 800 for time series data format conversion and analysis is illustrated. At step 805, method 800 includes receiving, using at least a processor, initial time series data in a static image format. This may be implemented as described and with reference to FIGS. 1-7.

Still referring to FIG. 8, at step 810, method 800 includes converting, using at least a processor, time series data to the target domain time series protocols such that the source time series data is usable within the target domain. This may be implemented as described and with reference to FIGS. 1-7.

Still referring to FIG. 8, at step 815, method 800 includes validating, using at least a processor, time series data in the target domain. Validation may be accomplished in multiple manners, including use of a discriminator model. This may be implemented as described and with reference to FIGS. 1-7.

Still referring to FIG. 8, at step 820, method 800 may include continuing conversion, using the at least a processor, the time series data if it is insufficiently compatible with target domain protocols. This may be implemented as described and with reference to FIGS. 1-7.

Still referring to FIG. 8, at step 825, method 800 may include analyzing, using the at least a processor, the validated time series data for patterns, anomalies, and/or diagnosable conditions. This may be implemented as described and with reference to FIGS. 1-7.

Figure 9:
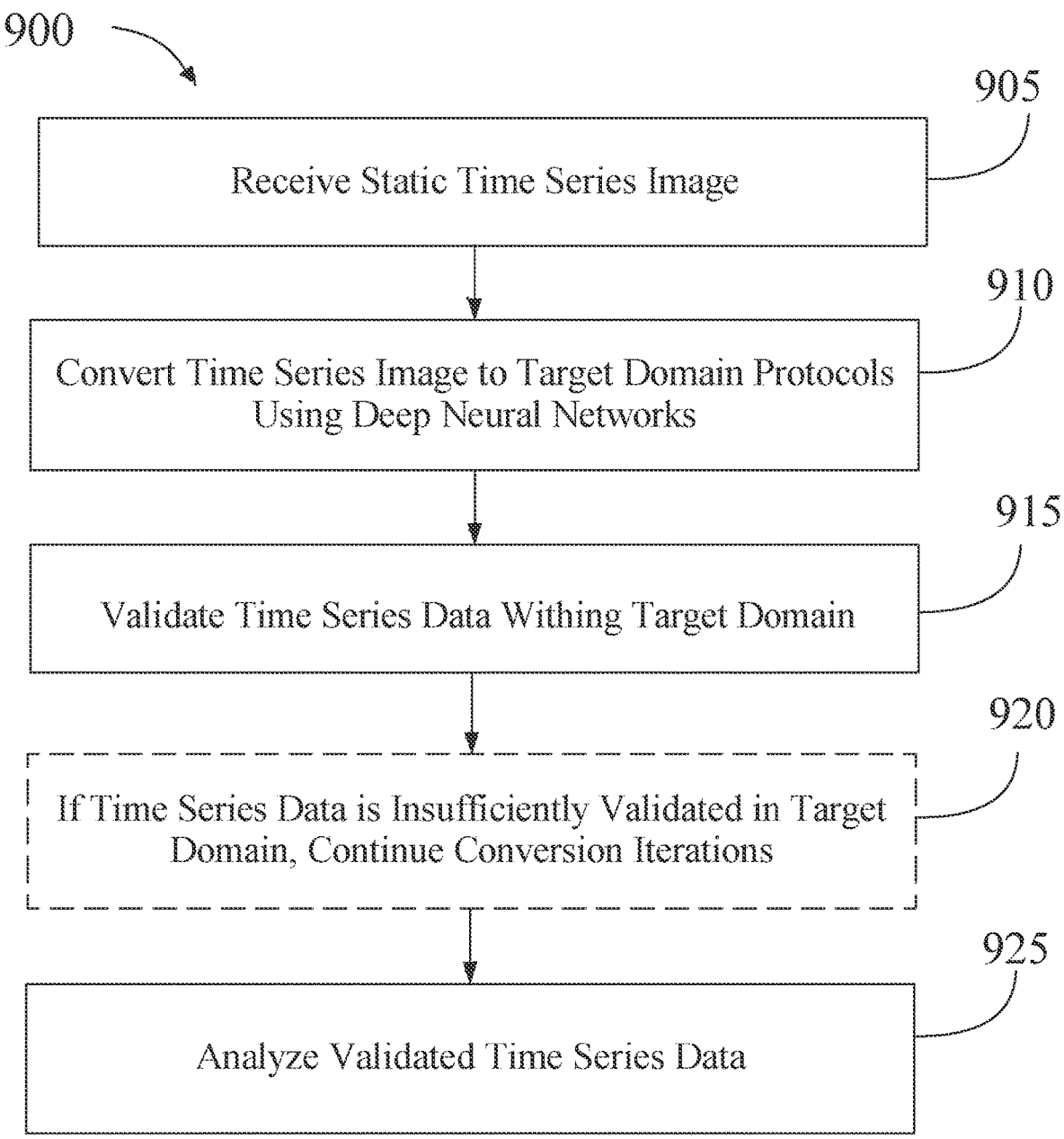
FIG. 9 is a flow diagram of an exemplary method for unpaired time series to time series translation using deep neural networks.

Referring now to FIG. 9, a flow diagram of an exemplary method 900 for time series data format conversion and analysis is illustrated. FIG. 9 reflects same flow and steps as FIG. 8, but incorporates a deep neural network as the primary device conducting the conversion. This may be implemented as described and with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
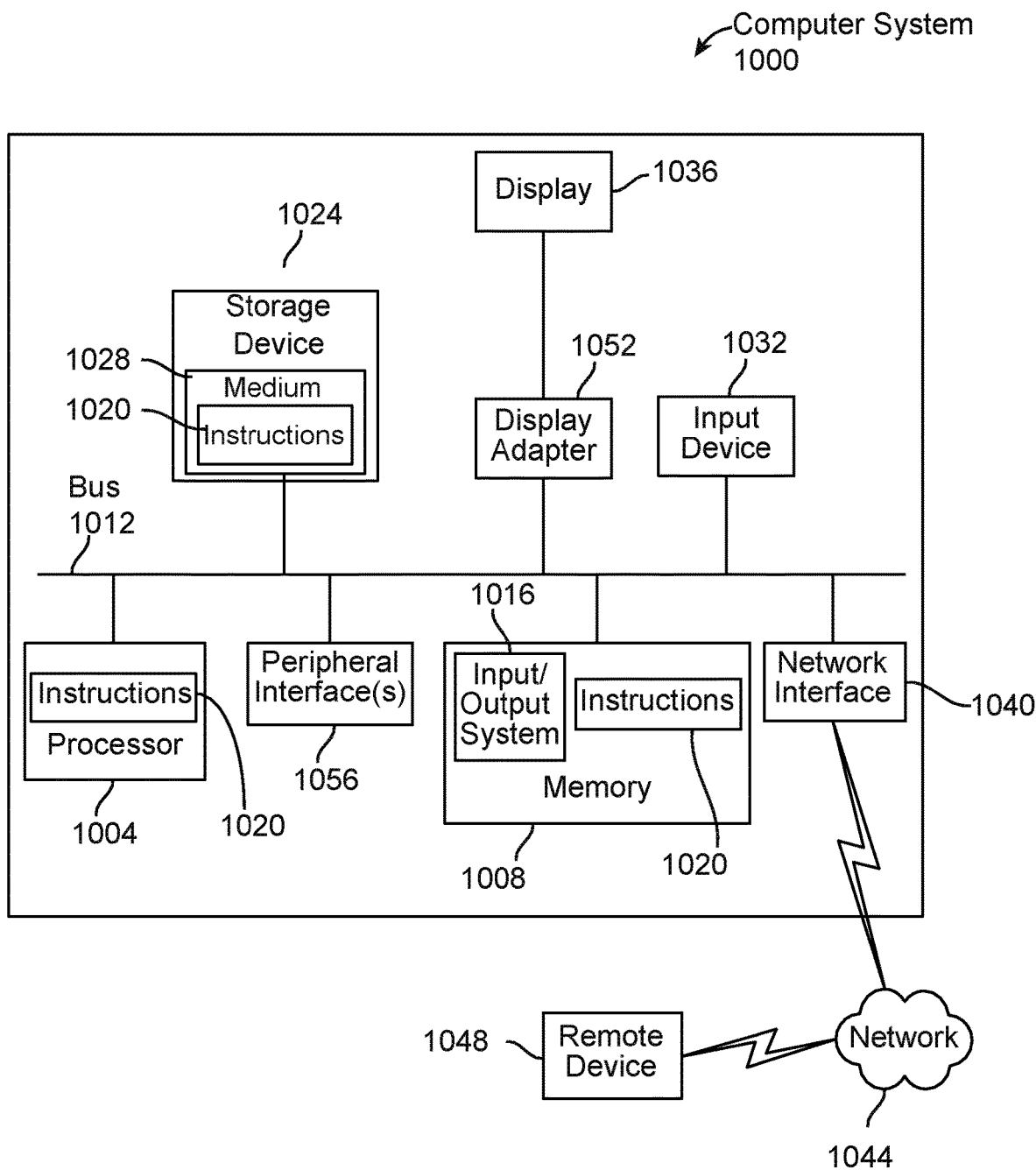
FIG. 10 is a block diagram of a computing system that can be used to implement any one or more of the methodologies disclosed herein and any one or more portions thereof.

Referring now to FIG. 10, a diagrammatic representation of one embodiment of a computing device in the exemplary form of a computer system 1000 within which a set of instructions for causing a control system to perform any one or more of the aspects and/or methodologies of the present disclosure may be executed is illustrated. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), FPGA, Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIRE-WIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for time series data format conversion and analysis using machine learning, wherein the apparatus comprises:
at least a processor, and a memory communicatively connected to the at least a processor, the memory containing instructions configuring the at least a processor to:
receive a static image comprising a time series of measured values, wherein the at least a time series of measured values represents an electrocardiogram (ECG) of a subject;
iteratively train a generative machine learning model comprising a generator and a discriminator with training data comprising exemplary time series data and a plurality of synthetic static images, wherein the generator is configured to generate a synthetic static image to which the discriminator is configured to compare the synthetic static image to the training data for authenticity of a time series in a target domain, wherein a output of the discriminator is evaluated by a binary classifier configured to provide incorrect assessments by the discriminator as updates to the training data of the generative machine learning model;
convert the time series of measured values from the static image to a target domain protocol, wherein the conversion comprises:
parsing the time series of measured values to ECG data comprising data points representing the ECG of the subject,
wherein the data points represent lead signal and time and parsing the time series of measure values to ECG data comprises:
inputting the static image into the generative machine learning model; and
outputting, by the generative machine learning model, the ECG data;
instantiate a machine-learning model on an analytical circuit device, wherein the machine-learning model configures the analytical circuit device to perform an analytical process;
input the ECG data to the instantiated machine-learning model; and
output a diagnosis based on the ECG data.

2. The apparatus of claim 1, wherein:
the at least a time series further comprises a first time series including a first static image in a first static image format and a second time series in a second static image in a second static image format; and
the second static image format is distinct from the first static image format.

3. The apparatus of claim 2, wherein converting the at least a time series further comprises:
converting the first static image to a common domain protocol; and
converting the second static image to the common domain protocol.

4. The apparatus of claim 1, wherein the machine-learning model further comprises a diffusion-based machine-learning process.

5. The apparatus of claim 1, wherein the machine-learning model further comprises a generative machine-learning process using at least a deep neural network.

6. The apparatus of claim 5, wherein the at least a deep neural network includes a plurality of deep neural networks.

7. The apparatus of claim 1, wherein converting further comprises converting using a plurality of conditional inputs.

8. The apparatus of claim 1, further configured to:
retranslate the at least a time series from the target domain protocol to the at least an initial static image; and
validate the converted time series as a function of the retranslation.

9. A method for time series data format conversion and analysis, wherein the method comprises:
receiving, by a computing device, a time series of measured values, wherein the time series of measured values is a static image;
iteratively training, by the computing device, a generative machine learning model comprising a generator and a discriminator with training data comprising exemplary time series data and a plurality of synthetic static images, wherein the generator is configured to generate a synthetic static image to which the discriminator is configured to compare the synthetic static image to the training data for authenticity of a time series in a target domain, wherein a output of the discriminator is evaluated by a binary classifier configured to provide incorrect assessments by the discriminator as updates to the training data of the generative machine learning model;
converting, by the computing device, the time series of measured values from the static image to a target domain protocol, wherein the conversion comprises:
parsing the time series of measured values to ECG data comprising data points representing the ECG of a subject, wherein the data points represent lead signal and time and parsing the time series of measure values to ECG data comprises:
inputting the static image into the generative machine learning model; and
outputting, by the generative machine learning model, the ECG data;
instantiating, by the computing device, a machine-learning model on an analytical circuit device, wherein the machine-learning model configures the analytical circuit device to perform an analytical process;
inputting, by the computing device, the ECG data to the instantiated machine-learning model; and
outputting, by the computing device, a diagnosis based on the ECG data.

10. The method of claim 9, wherein:
the at least a time series further comprises a first time series including a first static image in a first static image format and a second time series in a second static image in a second static image format; and
the second static image format is distinct from the first static image format.

11. The method of claim 10, wherein converting the at least a time series further comprises:
converting the first static image to a common domain protocol; and
converting the second static image to the common domain protocol.

12. The method of claim 9, wherein the generative machine learning model relies on machine-learning processes to iteratively map, by the computing device, an input to an output and comparatively eliminate cycle consistency losses as referenced against a concurrent mapping sequence.

13. The method of claim 9, wherein generative machine learning model further comprises a diffusion-based machine-learning process.

14. The method of claim 9, wherein the generative machine learning model further comprises a generative machine-learning process using at least a deep neural network.

15. The method of claim 14, wherein the at least a deep neural network includes a plurality of deep neural networks.

16. The method of claim 6, wherein converting further comprises converting using a plurality of conditional inputs.

17. The method of claim 9, further comprising:
retranslating the at least a time series from the target domain protocol to the at least an initial static image; and
validating the converted time series as a function of the retranslation.

18. The method of claim 9, wherein converting the time series between domains comprises converting, by the computing device, the time series between domains using diffusion models based on energy-guided stochastic calculus-based equations.

19. The method of claim 9, wherein receiving automated analysis of time series comprises receiving, by the computing device, the automated analysis of time series using a neural network of connected devices.

20. The method of claim 9, wherein receiving the automated analysis of time series comprises receiving, by the computing device, the automated analysis of time series from a scanned image relying on optical character recognition to interpret any available printed data.

21. The method of claim 9, wherein validating the conversion by reverse-translating the time series back to the original domain and verifying consistency is accomplished using machine-learning processes to assess, by the computing device, the translated data against a confidence threshold.

22. The method of claim 9, further comprising generating, using the computing device, a summary or recommendation based on the converted time series and an external machine-learning model.

* * * * *